US008295350B2

(12) United States Patent
Murakami et al.

(10) Patent No.: US 8,295,350 B2
(45) Date of Patent: *Oct. 23, 2012

(54) IMAGE CODING APPARATUS WITH SEGMENT CLASSIFICATION AND SEGMENTATION-TYPE MOTION PREDICTION CIRCUIT

(75) Inventors: Tokumichi Murakami, Tokyo (JP); Kohtaro Asai, Tokyo (JP); Yoshihisa Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/771,864

(22) Filed: Apr. 30, 2010

(65) Prior Publication Data

US 2010/0208812 A1   Aug. 19, 2010

Related U.S. Application Data

(62) Division of application No. 11/360,510, filed on Feb. 24, 2006, now abandoned, which is a division of application No. 10/879,192, filed on Jun. 30, 2004, now abandoned, which is a division of application No. 09/436,258, filed on Nov. 9, 1999, now Pat. No. 6,798,834, which is a division of application No. 08/915,590, filed on Aug. 21, 1997, now abandoned, which is a division of application No. 08/698,417, filed on Aug. 15, 1996, now abandoned.

(51) Int. Cl.
*H04N 7/12* (2006.01)
(52) U.S. Cl. .................................. 375/240.12
(58) Field of Classification Search ............. 375/240.01, 375/240.08, 240.12, 240.26; *H04N 7/12*
See application file for complete search history.

(56) References Cited

U.S. PATENT DOCUMENTS

| 4,703,351 A | 10/1987 | Kondo |
| 5,191,414 A | 3/1993 | Sugiyama |
| 5,444,489 A | 8/1995 | Truong et al. |
| 5,452,104 A | 9/1995 | Lee |
| 5,459,523 A | 10/1995 | Tanaka |
| 5,592,227 A | 1/1997 | Feng |
| 5,596,362 A | 1/1997 | Zhou |
| 5,608,458 A | 3/1997 | Chen et al. |
| 5,612,751 A | 3/1997 | Kondo |
| 5,751,363 A | 5/1998 | Miyamoto |
| 6,798,834 B1 | 9/2004 | Murakami et al. |

FOREIGN PATENT DOCUMENTS

JP   57-157696   9/1982

(Continued)

OTHER PUBLICATIONS

Schreiber Translations, Inc., Image Coder, Japan, Kokai 7-222145 translation, PTO 97-1130, pp. 1-40 (texts) and pp. 10-17 (Figures), Jan. 1997.

(Continued)

*Primary Examiner* — Young Lee
(74) *Attorney, Agent, or Firm* — Birch, Stewart, Kolasch & Birch, LLP.

(57) ABSTRACT

A segmenting section divides an input image into a plurality of segments. A hierarchizing section determines classes of the respective segments according to a predetermined criterion, and produces a class identification signal indicating the classes of the respective segments. A coding section encodes the segmented image signal into code data while changing the value of a coding control parameter for each of the segments in accordance with the class identification signal. Examples of the coding control parameter are a coding time interval and precision of quantization.

2 Claims, 18 Drawing Sheets

FOREIGN PATENT DOCUMENTS

| | | |
|---|---|---|
| JP | 60-10887 | 1/1985 |
| JP | 61-164390 | 7/1986 |
| JP | 62-12287 | 1/1987 |
| JP | 62-104387 | 5/1987 |
| JP | 63-157579 | 6/1988 |
| JP | 1-144875 | 6/1989 |
| JP | 1-228384 | 9/1989 |
| JP | 1-245684 | 9/1989 |
| JP | 2-32688 | 2/1990 |
| JP | 2-214390 | 8/1990 |
| JP | 2-264585 | 10/1990 |
| JP | 2-295289 | 12/1990 |
| JP | 3-133290 | 6/1991 |
| JP | 3-265392 | 11/1991 |
| JP | 4-7989 | 1/1992 |
| JP | 4-156794 | 5/1992 |
| JP | 4-321391 | 11/1992 |
| JP | 4-345290 | 12/1992 |
| JP | 4-354489 | 12/1992 |
| JP | 4347987 | 12/1992 |
| JP | 5-37915 | 2/1993 |
| JP | 5-111015 | 4/1993 |
| JP | 5328334 | 12/1993 |
| JP | 6-22292 | 1/1994 |
| JP | 6-168330 | 6/1994 |
| JP | 7222145 | 8/1995 |
| JP | 7-222145 | 8/1998 |

OTHER PUBLICATIONS

PCT 94, "A study of very low bitrate video coding using motion compenstion based on region segmentation and integration", pp. 109-110.

International Telegraph and Telephone Consultative Committee, Recommendation H.261 of ITU-T.

PCT 94, "Video Sequence Coding Based on Segment-Model and Priority Control", (Picture Coding Symposium), pp. 325-328.

FIG. 13A
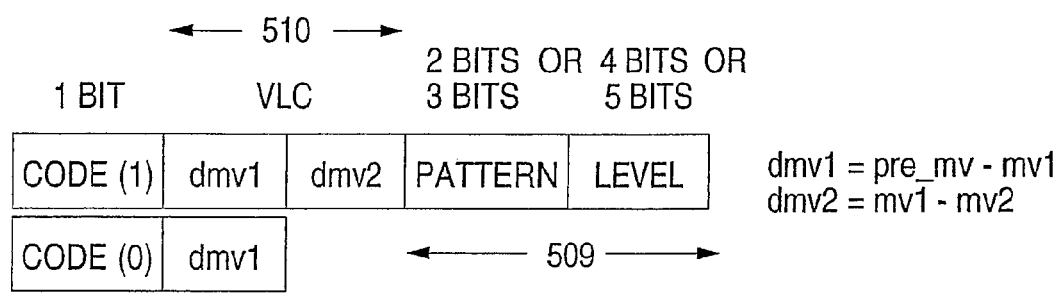
FIG. 13B
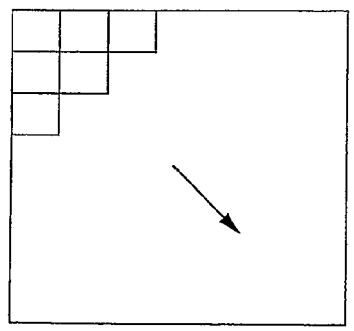
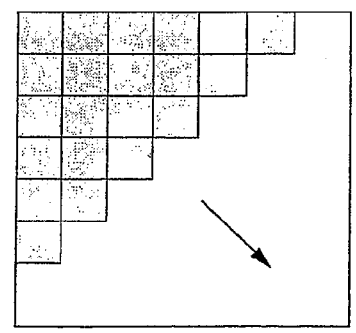

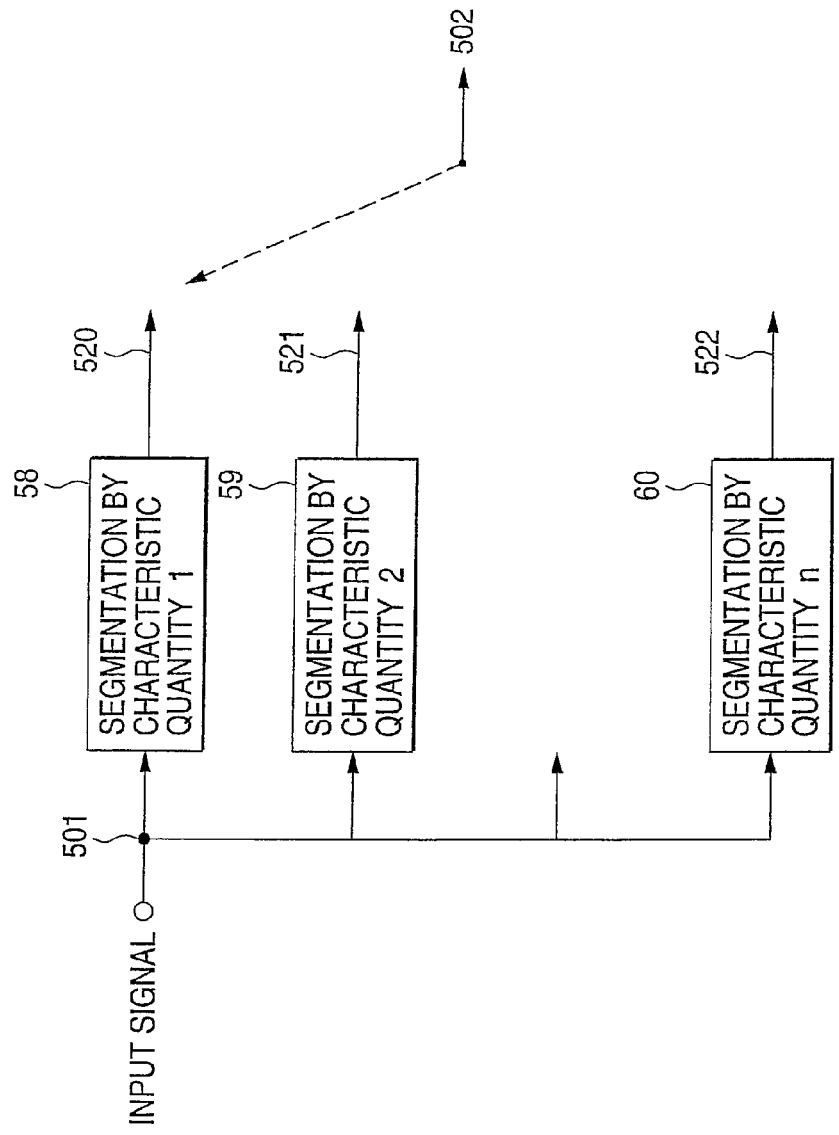

IMAGE CODING APPARATUS WITH SEGMENT CLASSIFICATION AND SEGMENTATION-TYPE MOTION PREDICTION CIRCUIT

This application is a Divisional of application Ser. No. 11/360,510, filed on Feb. 24, 2006, which is a Divisional of application Ser. No. 10/879,192, filed on Jun. 30, 2004; which is a Divisional of application Ser. No. 09/436,258, filed on Nov. 9, 1999; which is a Divisional of application Ser. No. 08/915,590, filed on Aug. 21, 1997, now abandoned; which is a Divisional of application Ser. No. 08/698,417 filed on Aug. 15, 1996, now abandoned. The entire contents of all of the aforementioned applications are incorporated by reference.

BACKGROUND OF THE INVENTION

1. Field of the Invention

The present invention relates to an image coding apparatus which is used in image communications equipment such as visual telephone and teleconferencing equipment and image storage/recording equipment such as a digital VTR.

The invention also relates to a motion prediction circuit which performs motion detection and motion prediction on image information as well as to image coding and decoding apparatuses to which the above motion prediction circuit is applied.

2. Description of the Related Art

Conventionally, various image coding techniques have been developed to improve the efficiency of transmission and recording of digital images.

FIG. 9 is a block diagram showing a prior art image coding apparatus that is shown in Recommendation H.261 of ITU-T (International Telegraph and Telephone Consultative Committee). In this apparatus, first an input digital image signal 101 to be coded is input to a differentiator 21. The differentiator 21 takes a difference between the input digital image signal 101 and a prediction signal 136 (described later), and outputs a resulting difference signal as a prediction error signal 131. A coding section 22 encodes the prediction error signal 131 and outputs resulting code data 132. The above Recommendation employs, as a coding method in the coding section 22, a technique of converting the prediction error signal 131 from the spatial domain to the frequency domain by using DCT (discrete cosine transform) that is a kind of quadrature transform, and linearly quantizing resulting transform coefficients.

The code data 132 as output from the coding section 22 in branched into two parts, one of which is sent to a reception-side decoding apparatus (not shown). The other part is input to a decoding section 23 of the image coding apparatus under discussion. The decoding section 23 performs an inverse operation to the operation of the coding section 22, that is, it produces a decoded prediction error signal 133 based on the code data 132. An adder 24 adds the decoded prediction error signal 133 to the prediction signal 136, to thereby produce a decoded image signal 134. One frame of the image signal 134 is stored in a memory 25 such as a frame memory. The memory 25 outputs the stored decoded image signal of one frame after delaying it by one frame, as a decoded image signal 135 of a preceding frame. A predictor 26 produces the prediction signal 136 and a motion vector 137 by performing motion-compensating prediction based on the input digital signal 101 to be coded and the 1-frame preceding decoded image signal 135. The motion vector 137 is sent to the reception-side decoding apparatus (not shown) and the prediction signal 136 is supplied to the differentiator 21 and the adder 24.

In the conventional image coding apparatus having the above configuration, the coding section 22 encodes an image of one frame substantially uniformly irrespective of the content of a subject image. Further, the image 25 operates such that an image of only one frame is stored therein and rewritten every frame. Therefore, the efficiency of coding cannot be improved in the conventional image coding apparatus.

A prior art motion prediction circuit is disclosed in Japanese Unexamined Patent Publication No. Hei. 4-347987, which is shown in FIG. 19. In FIG. 19, reference numeral 611 denotes a motion vector detecting circuit; 612, a segmenting circuit; and 613, a motion parameter detecting circuit. Further, reference numeral 601 denotes an input image signal; 602, interframe motion vectors; 603, a segmentation information; and 604, a motion parameter that is detected on a-segment-by-segment basis.

The above circuit operates in the following manner. An input image signal 601 is supplied to both the motion vector detecting circuit 611 and the segmenting circuit 612. The motion vector detecting circuit 611 detects a motion vector 602 on a pixel or small-block basis and supplies the detected motion vectors 602 to the motion parameter detecting circuit 613. On the other hand, the segmenting circuit 612 divides the input image signal 601 into a plurality of segments having different motion by dividing or combining blocks by referring to the motion vectors 602, and outputs segmentation information 603 indicating a manner of segmentation. The motion parameter detecting circuit 613 selects motion vectors belonging to a segment from the motion vectors 102, and calculates first-order conversion coefficients which describe motion of the segment based on the selected motion vectors. By performing this operation for all the segments, the motion parameter detecting circuit 613 outputs detected motion parameters 604 as motion information of the input image.

FIG. 20 shows details of the motion parameter detecting circuit 613. First, coordinates of N measurement points belonging to a target segment of motion parameter detection are selected. The N sets of measured coordinates are supplied to a center-of-gravity detecting circuit 621, which calculates coordinates of the center of gravity of the N measurement points.

The center-of-gravity detecting circuit 621 then converts the coordinates of the N measurement points into coordinates relative to the calculated center of gravity, and supplies the resulting coordinates to average detecting circuits 622-624. Further, x-components Vx(X, Y) of the N measured motion vectors are input to the average detecting circuit 622, and y-components Vy(X, Y) are input to the average detecting circuit 624. The average detecting circuits 622-624 calculate various averages and supply those averages to first-order conversion coefficients detecting circuits 625 and 626. The first-order conversion coefficients detecting circuit 625 calculates first-order conversion coefficients a, b, and e by a method of least squares based on the received averages. Similarly, the first-order conversion coefficients detecting circuit 626 calculates first-order conversion coefficients c, d, and f. These coefficients are used as motion parameters of the segment concerned. Thus, the motion parameters of each segment of the input image are obtained.

Another conventional motion prediction circuit is disclosed in Japanese Unexamined Patent Publication No. Hei. 5-328334. This publication discloses a block coding scheme in which coding is performed in units of enlarged blocks each obtained by combining similar adjacent blocks.

In the first conventional example described above, a method of least squares is used in converting the motion vectors 602 into the motion parameters 604, i.e., first-order conversion coefficients. This is based on the assumption that the motion of a segment is sufficiently small. Therefore, detection errors become large when the motion is large.

Further, coordinates of N measured points belonging to the target segment are needed to produce the motion parameters 604. In the case of real-time communication of moving images, this requires that motion vectors of each segment of an input image be measured automatically at high speed with high accuracy, which is not realistic.

Still further, there is no criterion to judge whether optimum segments have been obtained for the motion vectors detecting operation. Therefore, the prediction performance strongly depends on the accuracy of segmentation.

On the other hand, in the second conventional example described above, coding is performed on a block-by-block basis in which a plurality of blocks are combined into a larger block in a fixed manner. Therefore, the prediction error of an image cannot be made smaller than a block.

SUMMARY OF THE INVENTION

The present invention has been made to solve the above problems in the art and, therefore, has an object of providing an image coding apparatus which can improve the efficiency of coding by coding an image in accordance with its content and rewriting the contents of memories in accordance with the content of an image.

Another object of the invention is to provide a motion prediction circuit which can correctly perform motion prediction with a prediction error smaller than a block, and which can always perform correct motion prediction without the needs of high-speed calculation and obtaining measured values.

According to a first aspect of the invention, there is provided an image coding apparatus comprising:
  a segmenting section for dividing an input image into a plurality of segments, and producing an image signal such that the respective segments are distinguished from each other;
  a hierarchizing section for determining classes of the respective segments according to a predetermined criterion, and producing a class identification signal indicating the classes of the respective segments; and
  a coding section for coding the image signal into code data while changing a value of a coding control parameter for each of the segments in accordance with the class identification signal.

Further, there is provided an image coding apparatus comprising:
  a segmenting section for dividing an input image into a plurality of segments, and producing an image signal such that the respective segments are distinguished from each other;
  a hierarchizing section for determining classes of the respective segments according to a predetermined criterion, and producing a class identification signal indicating the classes of the respective segments;
  a plurality of coding sections for coding the image signal into code data according to different coding schemes; and
  a switch section for selecting one of the plurality of coding sections for each of the segments in accordance with the class identification signal.

Further, there is provided an image coding apparatus comprising:
  a segmenting section for dividing an input image into a plurality of segments, and producing an image signal such that the respective segments are distinguished from each other;
  a hierarchizing section for determining classes of the respective segments according to a predetermined criterion, and producing a class identification signal indicating the classes of the respective segments;
  a plurality of memories for storing a past image signal;
  a prediction section for reading, on a segment-by-segment basis, a prediction source image signal that is similar to the image signal produced by the segmenting section from the plurality of memories, and for producing a prediction signal by predicting a current-frame image signal on a segment-by-segment basis based on the prediction source image signal;
  a prediction error extracting section for extracting a prediction error signal on a segment-by-segment basis based on the prediction signal and the actual image signal of a current frame that is produced by the segmenting section;
  a coding section for coding the prediction error signal into code data;
  a decoding section for decoding the coded data into a decoded prediction error signal;
  a signal combining section for combining the decoded prediction error signal and the prediction signal into a decoded image signal; and
  a memory control section for storing portions of the decoded image signal corresponding to the respective segments into the plurality of memories while switching among the plurality of memories in accordance with the class identification signal, to thereby update storage contents of the plurality of memories.

According to a second aspect of the invention, there is provided a segmentation-type motion prediction circuit comprising:
  first segmenting means for segmenting, when necessary, each of blocks of an input image signal into a plurality of segments by extracting a feature of the input image signal on a block-by-block basis;
  motion vector detecting means for detecting motion vectors for the respective segments;
  segment boundary line approximating means for determining a pattern and a level of each of the blocks from a boundary line between the segments belonging to the block;
  motion vector re-search means for adjusting motion vectors of the respective segments based on the pattern and the level, and for producing segment boundary line information, final motion vectors, and prediction image information.

There is provided an image coding apparatus comprising:
a segmentation-type motion prediction circuit comprising:
  segmenting means for segmenting each of blocks of an input image signal into a plurality of segments by extracting a feature of the input image signal;
  motion vector detecting means for detecting motion vectors for the respective segments;
  segment boundary line approximating means for determining a pattern and a level of each of the blocks from a boundary line between the segments belonging to the block; and
  motion vector re-search means for determining motion vectors of the respective segments based on the pattern and the level, producing prediction image information, and transmitting the final motion vectors and segment boundary line information;

quantizing means for quantizing transform coefficients that is obtained by transform-coding a difference between the input image signal and the prediction image information;

dequantizing means for dequantizing the quantized transform coefficients;

a frame memory for storing, as a decoded image signal of a current frame, a sum of a decoded image signal of a preceding frame and a prediction error image signal that is obtained by inverse-transform-decoding the dequantized transform coefficients; and variable-length coding means for coding the quantized transform coefficients and transmitting resulting coded image data.

There is provided a segmentation-type motion-predictive image decoding apparatus comprising:

dequantizing means for dequantizing decoded transform coefficients of transmitted or reproduced coded image data;

inverse transform decoding means for inverse-transform-decoding the dequantized transform coefficients into a prediction error image signal;

segment boundary line decoding means for producing a boundary line of each block from a transmitted or reproduced segment boundary line information; and prediction image generating means for generating a prediction image signal from the boundary line, transmitted or reproduced motion vectors of respective segments, and a decoded image signal of a preceding frame; and means for producing a decoded image signal from the prediction error image signal and the prediction image signal.

BRIEF DESCRIPTION OF THE DRAWINGS

FIGS. 13A and 13B illustrate a relationship between segment boundary line coded information and a segment boundary line pattern and level in the fourth embodiment;

FIG. 14 shows the configuration of a segmenting section of a motion prediction circuit according to a fifth embodiment of the invention;

DESCRIPTION OF THE PREFERRED EMBODIMENTS

Embodiments of the present invention will be hereinafter described with reference to the accompanying drawings.

Embodiment 1

Figure 1:
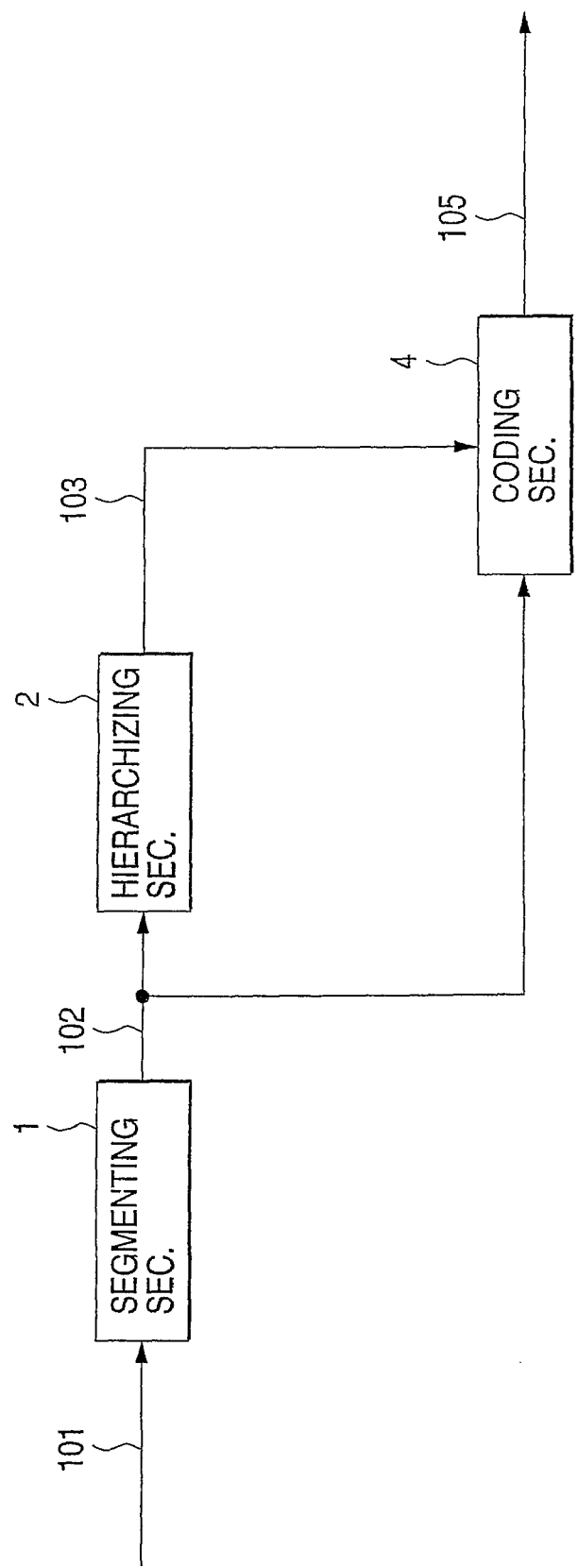
FIG. 1 is a block diagram showing an image coding apparatus according to a first embodiment of the present invention.

FIG. 1 is a block diagram showing an image coding apparatus according to a first embodiment of the invention. As shown in FIG. 1, first an input digital image signal 101 to be coded is input to a segmenting section 1. Having an image storage memory such as a frame memory, the segmenting section 1 develops an input image in the memory based on the input image signal 101 of one frame, and dividing the thus-developed input image into a plurality of segments by utilizing, for instance, a particular shape included in the image.

Figure 2:
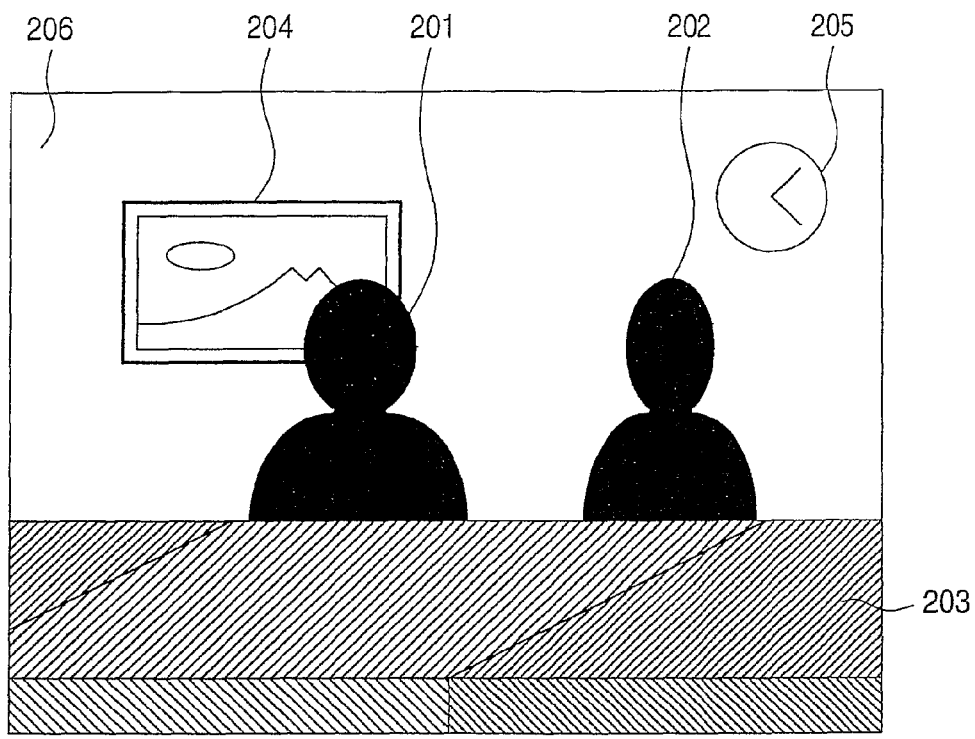
FIG. 2 shows an example of an input image that is given to an image coding apparatus.

An example of a segmentation technique is such that edges of an input image are detected by, for instance, differentiating the input image developed on the image storage memory and a portion of the input image enclosed by the edges is made one segment. For example, where the apparatus under discussion is applied to teleconferencing, an image including persons and a background as shown in FIG. 2 is generally provided as an input image. By segmenting this image by edge detection, the image can be divided into a segment 201 of a moving person, a segment 202 of a motionless person, a segment 204 of a desk, a segment 204 of a painting, a segment 205 of a clock, and a segment 206 of a wall (the segments 203-206 constitute the background and the segments 201-203 constitute foreground).

In performing segmentation by edge detection, as for, for instance, an image of a human face, a segment of eyes, a nose, a mouth, etc. each being enclosed by edges are detected in a segment of the entire face which is also enclosed by edges. Such internal segments may be handled together as an integral segment of the entire face, rather than as separate segments. This contributes to improvement of coding, because the small individual segments need not be processed in the coding operation. The integration of the internal segments may be performed by a pattern recognition technique, for instance. That is, when a certain segment is recognized as representing a face by pattern recognition or the like, segments located therein and each enclosed by edges are integrated into a single segment rather than left separated.

After completion of the segmentation, the segmenting section 1 outputs an image signal 102 that is the input digital image signal 101 plus segmentation information, such that data of respective segments constituting the image data on the memory of the segmenting section 1 are output sequentially. In the case of the image of FIG. 2, data of the respective segments are output sequentially such that data of the segment 201 (moving person) is output first, data of the segment 202 (motionless person) is output next, and so forth, as the image signal 102. Each segment signal of the image signal 102 includes address information indicating the position each segment signal on the screen. Alternatively, the image signal 102 may be produced by outputting the image in the memory of the segmenting section 1 from its top-left portion to its bottom-right portion in the order of scanning lines, as in the case of the input digital image signal 101. In this case, identification information indicating a segment to which each component signal belongs is added to the component signal overhead information.

The thus-obtained image signal 102 including the segmentation information is branched into two parts, which are respectively input to a hierarchizing section 2 and a coding section 4.

Having an image storage memory such as a frame memory as in the case of the segmenting section 1, the hierarchizing section 2 develops images of the respective segments in the memory based on the image signal 102 that is supplied from the segmenting section 1. The hierarchizing section 2 judges degrees of importance of the respective segments of the entire image based on their developed images, and classifies the respective segments in accordance with their degrees of importance.

Where the respective segment signals of the image signal 102 is produced sequentially, the images of the respective segments are sequentially formed on the memory of the hierarchizing section 2 and subjected, in the same order, to the degree-of-importance judgment, whereby they are classified. On the other hand, where the image signal 102 is produced in the ordinary scanning order with overhead information indicating a corresponding segment added to each component signal, the degree of importance of the respective segments is judged after the entire image is formed on the memory of the hierarchizing section 2.

The degree of importance of an image segment increases as the degree of attention of a viewer to that image segment in the entire image increases. However, the standard of judgment depends on an application of the apparatus concerned. For example, in the case of teleconferencing, persons are most important and still objects such as a desk/and a wall which constitute the background and foreground are less important. Further, it can be said that a person who is speaking (i.e., moving) is more important than motionless persons. Therefore, in the example of FIG. 2, where the respective segments are to be classified into three classes, the classification may be performed such that the segment 201 (moving person) is classified as class 1 (highest degree of importance), the segment 202 (motionless person) is classified as class 2 (medium degree of importance), and the segments of the desk, wall, etc. are classified as class 3 (lowest degree of importance). Other examples of indices representing the degree of importance are the magnitude of motion of a segment and the frequency of motion of a segment. In such cases, the degree of importance increases as the motion of a segment is larger or more frequent. The standard to be used in judging the degree of importance is set properly in accordance with, for instance, an application of the apparatus concerned.

For example, to perform the above-described segmentation by edge detection, the hierarchizing section 2 distinguishes segments of persons from the other segments such as a background wall by performing, for instance, pattern recognition on edge shapes of the respective segments, and further distinguishes a person who is speaking from the other persons by considering additional information on the motion of each segment between the current and preceding frames. The classification is performed such that a segment of a person who is speaking is classified as class 1 (highest degree of importance) and segments of objects excluding people are classified as class 3 (lowest degree of importance).

The hierarchizing section 2 classifies the respective segments in the above manner, and supplies a class identification signal 103 indicating classes of the respective segments to the coding section 4.

The coding section 4 encodes the image signal 102 that is output from the segmenting section 1 and includes the segmentation information by PCM, DPCM, or the like, and outputs code data 105. During this coding operation, the coding section 4 receives the class identification signal 103 of the respective segments from the hierarchizing section 2 in synchronism with the image signal 102. The coding section 4 encodes the image signal 102 of the respective segments while changing the value of a coding control parameter in accordance with the class identification signal 103.

An example of the coding control parameter is the time interval of coding. In this case, the coding time interval is set longer for a class having a lower degree of importance in accordance with the class identification signal 103 that is supplied from the hierarchizing section 2. That is, the coding time interval is increased, that is, the coding frequency is reduced as the degree of importance of a segment decreases. For example, a signal of a segment of class 1 (highest degree of importance) is coded every frame, a signal of a segment of class 2 (medium degree) is coded once per several frames, and a signal of class 3 is coded once per several tens of frames. By virtue of this operation, the amount of code data generated can be reduced from the case of uniform coding over the entire screen, that is, the coding efficiency can be improved. The coding time intervals for the respective classes are determined properly in consideration of a tradeoff between the image quality and the coding efficiency.

In teleconferencing etc., there may occur a case that behavior of each person is the only information that needs to be transmitted as an image and images of the background etc. are not necessary. In this case, it may be conceivable to code only the signals of class-1 and class-2 segments (persons) and stop coding of class-3 segments (background etc.), thus enabling further reduction of the amount of code data generated. In this case, the decoding apparatus cannot obtain code data of segments of the background etc. A decoded image is produced by outputting, for the segments of the background etc., a blue-back signal or a stored background image, for instance.

An example of the coding control parameter other than the coding time interval is the precision of quantization of the coding performed in the coding section 4. That is, based on the class identification signal 103, the coding is so performed so that the precision of quantization is set higher for segments of a higher degree of importance, thus reducing the amount of code data generated. With this operation, the amount of code data generated can be reduced as a whole while high image quality is maintained in segments having a high degree of importance.

Figure 3:
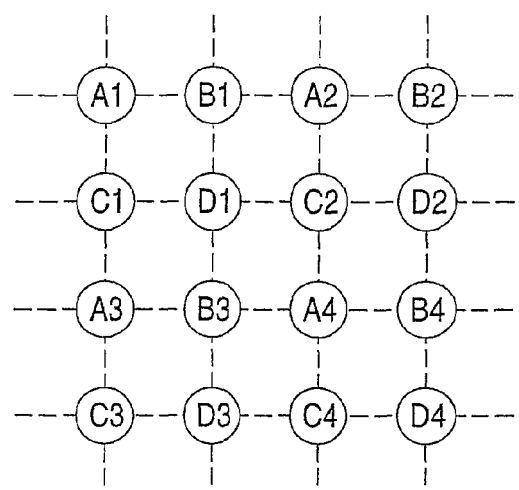
FIG. 3 illustrates sub-sampling.

Another example of the coding control parameter is the sub-sampling ratio utilized in coding the image signal 102, which is described with reference to FIG. 3. In FIG. 3, circles A1-D4 represent pixels in an image. In coding a segment of a class of a high degree of importance, all the pixels A1-D4 (image signal 102) are coded. Conversely, in coding a segment of a class of a low degree of importance, the pixels are sub-sampled every other pixel in both horizontal and vertical directions: pixels A1-A4 are coded while pixels B1-B4, C1-C4 and D1-D4 are not. By increasing the degree of thinning of pixels (i.e., sub-sampling ratio) for a segment having a lower degree of importance, the amount of generated code data of the entire image can be reduced. The degree of thinning is set properly in accordance with the degree of importance of the respective classes.

A further example of the coding control parameter is the threshold of the amount of code data generated. That is, in the coding section 4, a threshold (upper limit value) of code data generated is set for each class and control is so performed that coding is stopped when the generated code amount has reached the threshold. For example, the threshold of code data generated is set larger for a class of a higher degree of importance to allow coding of the entire image signal 102. Conversely, the threshold is set smaller for a class of a lower degree of importance and the coding is stopped when the amount of code data generated has reached the threshold. That is, the threshold is set smaller for a class of a lower degree of importance. As a result, the amount of generated code data of the entire image can be reduced while high image quality is maintained in segments having a high degree of importance.

In this case, the decoding-side apparatus cannot obtain image data after the coding is stopped. The entire image is produced, for instance, by using a corresponding image portion of the preceding frame.

As described above, according to the invention, an image for coding is segmented, resulting segments are classified in accordance with their degrees of importance, and the value of the coding control parameter is changed in accordance with the class of a segment in coding an image signal portion of that segment. Thus, the coding efficiency of the entire image can be improved by reducing the amount of generated code data of segments having a low degree of importance.

While the above description of the embodiment is directed to the case where the segmentation is performed by using edges in an image and the classification (hierarchization) is performed based on edge shapes, the segmentation and classification may be performed in a different manner.

For example, the segmentation and classification may be performed by using texture analysis, which is similar to the edge detection. In the texture analysis, an image is divided into segments each having a certain structure (texture), such as a segment of vertical stripes and a segment of horizontal stripes. Since in many cases a wall, a desk, etc, have a certain structure (pattern), the texture analysis enables segmentation into a segment of the background (wall etc.) and the remaining segment. The segments thus obtained are classified by performing pattern recognition on their shapes or textures.

The edge detection and the texture analysis are techniques for dividing an image into segments of varied shapes each being enclosed by an outline (width: one pixel (or several pixels at maximum)) that depends on the content of an enclosed image. However, the invention can also be applied to a case of dividing and processing an image including blocks of the same size (the block division itself is conventional). In this case, a blocking section is provided upstream of the segmenting section 1, and an image signal is divided into blocks of the same size (for instance, 8.times.8 pixels) in the blocking section. The segmenting section 1 combines, into an integral segment, blocks having similar image signal portions. The hierarchizing section 2 performs classification by judging, for instance, whether each segment represents a person or the background by performing pattern recognition on the shape, pattern, or the like of each segment. Where an image is divided into blocks as in this case, a block-based coding technique such as DCT can be used.

The segmentation and the classification may also be performed based on the activity of an image signal. The activity means the degree of variation of an image signal, and may be a squared error from the average of an image signal, that is, a variance. More specifically, an image is divided into blocks of the same size (for instance, 8.times.8 pixels), an average of an image signal portion and a variance from the average are calculated for each block, and the segmentation or classification is performed based on the average and the variance in a manner as exemplified below. Since in many cases an image portion of a wall or the like of the background has a fixed pattern, blocks having the same average and variance are regarded as a wall or the like and combined into a single segment, and classified as a class of a low degree of importance. Further, since a block including an edge such as an outline of a person has a large variance, i.e., activity, the segmentation is performed such that a portion enclosed by blocks having a large activity are regarded as a single segment. A judgment as to, for instance, whether that segment is actually a segment of a person is made by performing pattern recognition on its shape or the like, and the classification is performed based on the judgment.

Further, the segmentation and the classification may also be performed by using image data of past frames, that is, by utilizing the temporal information. That is, image data of past frames are stored in the memory, and motion of each portion of an image is detected by comparing an image of the current frame with images of the past frames. The image is divided into segments with motion and still segments. The former segments are classified as segments having a high degree of importance and the latter segments are classified as segments having a low degree of importance. Instead of segmenting an image merely based on the existence of motion, portions having approximately the same magnitude of motion may be combined into a single segment instead of segmenting an image merely based on the existence of motion. In this case, for example, a segment having a larger magnitude of motion is classified as a class of a higher degree of importance.

In the case of segmenting an image in accordance with its motion, segments may be classified in accordance with the frequency of motion rather than the magnitude of motion. More specifically, the hierarchizing section 2 stores motion information over a plurality of frames, calculates a frequency of motion of each segment covering a plurality of frames, and a segment having a higher frequency of motion is classified as a class of a higher degree of importance. By using a history of motion over a plurality of frames, a segment that is temporarily motionless can be classified without unduly lowering its degree of importance.

Embodiment 2

Figure 4:
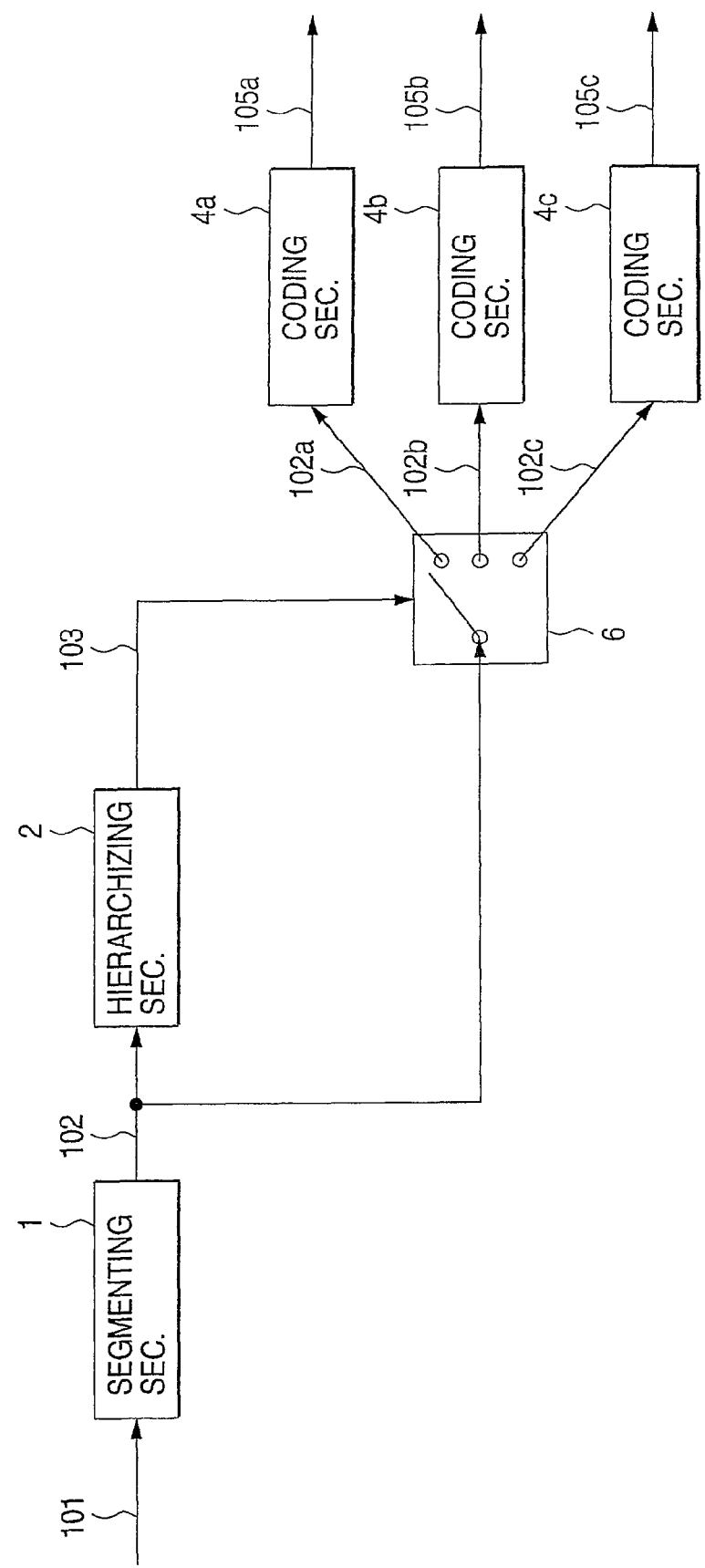
FIG. 4 is a block diagram showing an image coding apparatus according to a second embodiment of the invention.

FIG. 4 is a block diagram showing an image coding apparatus according to a second embodiment of the invention.

While in the first embodiment the value of the coding control parameter in the coding section 4 is changed in accordance with the class of a segment being coded, in the second embodiment a plurality of coding sections of different coding schemes are used and one of the coding sections is selected in accordance with the class of a segment.

In FIG. 4, the segmenting section 1 and the hierarchizing section 2 operate in the same manner as in the first embodiment.

Coding sections 4a-4c employ different coding schemes. For example, the coding section 4a performs coding which generates a large amount of code data but allows production of a lossless decoded signal. The coding section 4b performs coding which reduces the amount of generated code data to some extent by conducting quantization, for instance. The coding section 4c performs very rough coding in which, for instance, only an average of pixel levels of each segment is output.

In coding each segment, a class identification signal 103 is supplied to a switch section 6 in synchronism with a portion of an image signal 102 corresponding to the segment. In the switch section 6, switching is performed in accordance with the class identification signal 103 so that a portion of the image signal 102 corresponding to each segment is input to a coding section suitable for a class of the segment. For example, a segment of the image signal 102 of a moving person or the like which segment is classified as a class of a highest degree of importance is coded by the coding section 4a which allows the decoding side to produce a high-quality image, and code data 105a is obtained. A segment of a motionless person which segment is classified as a class of a medium degree of importance is coded by the coding section 4b, and code data 105b is obtained. Further, a segment of the background or the like which segment is classified as a class of a low degree of importance and which permits generation of a decoded signal that is much different from an input signal is coded by the coding section 4c, and code data 105c is obtained.

In this manner, this embodiment can improve the coding efficiency by reducing the amount of generated code data of segments having a low degree of importance.

Although this embodiment is directed to the case where segments are classified into three classes, the number of classes is not limited to three. Where segments are classified into some other number of classes, there may be provided coding sections of different coding schemes in the same number as the number of classes.

It is not always necessary that the number of coding sections be equal to the number of classes. That is, the number of coding sections can be reduced by partially employing the operation of the first embodiment in which the value of the coding control parameter is changed. For example, two coding sections are provided for three classes such that one of the two coding section operate for two classes and the value of the coding control parameter is changed in accordance with the class in that coding section. This configuration provides the same advantage as described above.

The coding schemes employed in the coding sections 4a-4c are not limited to the above ones, but may be selected for the respective classes in accordance with the quality of a decoded image required for each class and an allowable amount of generated code data for each class.

Embodiment 3

Figure 5:
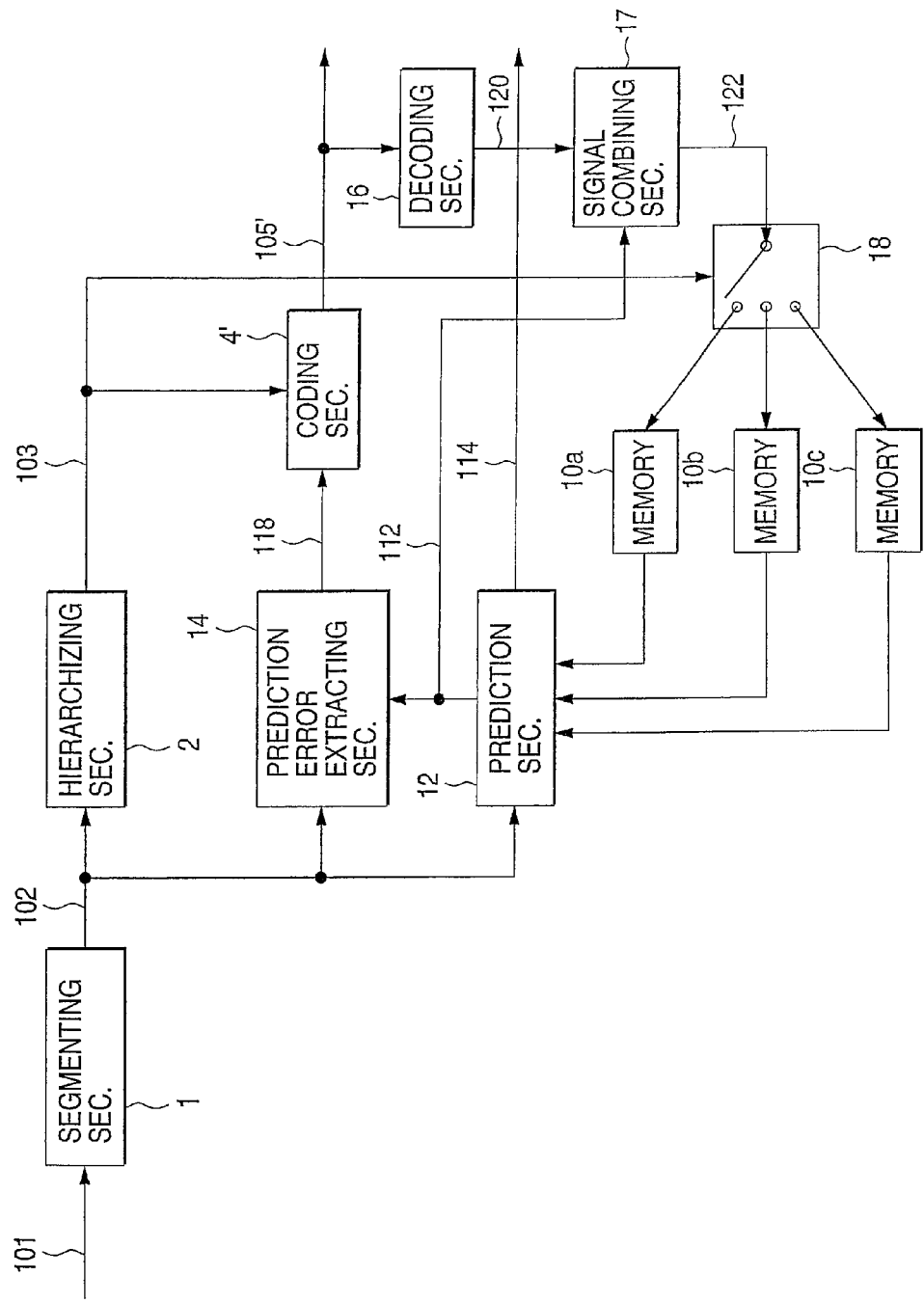
FIG. 5 is a block diagram showing an image coding apparatus according to a third embodiment of the invention.

FIG. 5 is a block diagram showing an image coding apparatus according to a third embodiment of the invention.

In this embodiment, the control in accordance with the class of each segment is applied to interframe-prediction-based coding. As is known in the art, in interframe-prediction-based coding, a prediction signal is generated by predicting an image of the current frame from an image of a past frame stored in a memory, a prediction error signal is calculated from the prediction signal and an actual input image signal by, for instance, taking a difference therebetween, and the prediction error signal is encoded and output. On the decoding side, a similar apparatus for calculating a prediction signal is provided, and a decoded signal is produced by adding the prediction error signal that is sent from the coding side to the prediction signal.

In FIG. 5, the segmenting section 1 and the hierarchizing section 2 operate in the same manner as in the first embodiment.

Figure 6A:
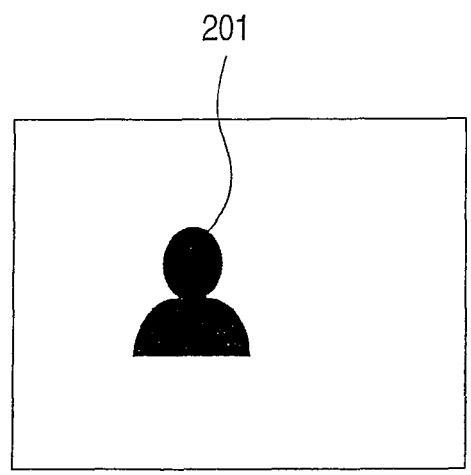
FIGS. 6A-6C illustrate contents of memories used in the third embodiment.
Figure 6B:
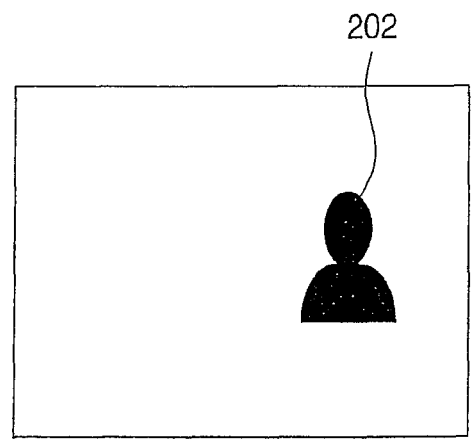
Figure 6C:
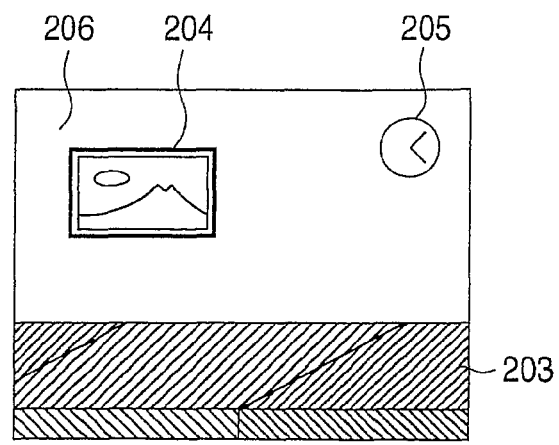

In this embodiment, memories (for instance, frame memories) 10a-10c store images of respective classes. That is, the configuration of FIG. 5 is such that segments are classified into three classes. For convenience of description, it is assumed that the memories 10a-10c are for segments of the class of a highest degree of importance, the class of a medium degree of importance, and the class of a lowest degree of importance, respectively. In this case of coding, for instance, the image of FIG. 2, data of the segment 201 (moving person) is stored in the memory 10a, data of the segment 202 (motionless person) is stored in the memory 10b, and data of the desk segment 203, the painting segment 204, the clock segment 205, and the wall segment 206 which constitute the background and the foreground are stored in the memory 10c (see FIGS. 6A-6C).

The contents of the memories 10a-10c are images obtained by coding and then decoding an input image signal, i.e., images of a past frame. The contents of the memories 10a-10c are updated every frame or once per several frames (described later).

In coding a portion of an image signal 102 corresponding to each segment, which signal is output from the segmenting section 1, a prediction section 12 searches the memories 10a-10c for an image signal portion similar to the above portion of the image signal 102. More specifically, in this embodiment, the segmenting section 1 sequentially outputs portions of the image signal 102 corresponding to respective segments so that a portion of each segment is output en bloc. The prediction section 12 finds an image portion similar to the segment to be coded from the image data (image signal portions) stored in the memories 10a-10c by comparing the integral image signal portion of the segment with the image data of the respective segments stored in the memories 10a-10c. For example, this is done by calculating differences between the portion of the image signal 102 corresponding to the segment to be coded and the respective image data in the memories 10a-10c, and employing, as a similar image portion, image data in the memories 10a-10c which provides the smallest difference.

A similar image signal thus obtained by searching the memories 10a-10c is used as a prediction source image signal in the prediction section 12. That is, the prediction section 12 produces a prediction signal 112 by performing prediction based on the prediction source image signal by using a given prediction function. This operation is performed for each segment obtained by the segmenting section 1. The prediction signal 112 is output to a prediction error extracting section 14 and a signal combining section 17. Further, at the same time as the output of the prediction signal 112, the prediction section 12 outputs, to the decoding side, signal 114 indicating the number of a memory where a prediction image portion that was used for the prediction was stored and an address of the similar image portion on the memory. The decoding side is provided with a prediction section, three memories, etc. that are similar to those in this image coding apparatus. The signal 114 indicating the memory number and the address is used to generate a prediction signal in the prediction side.

The prediction error extracting section 14 extracts, for each segment, a prediction error signal 116 based on the image signal 102 and the prediction signal 112. This may be done by simply calculating a difference between the image signal 102 and the prediction signal 112, or by calculating a difference after applying proper weights to both signals.

A coding section 4' encodes the prediction error signal 114 according to a certain coding scheme, and outputs code data 105'.

A decoding section 16 decodes the code data 105' as output from the coding section 4' by performing an inverse operation to the operation of the coding section 4', and outputs a decoded prediction error signal 120. The signal combining section 17 combines the decoded prediction error 30 signal 120 with the above-mentioned prediction signal 112, to produce a decoded image signal 122. This may be done by simply adding together the two signals, by adding together the two signals after applying weights thereto, or by other methods. One of those methods is employed depending on the method of extracting the prediction error signal 116 in the prediction error signal extracting section 14.

The decoded image signal 122 is input to a memory control section 18. The memory control section 18 switches among the memories 10a-10c in accordance with a class identification signal 103 supplied from the hierarchizing section 2 so that portions of the decoded image signal 122 corresponding to the classes of respective segments. The storage data of the memories 10a-10c are updated every time they receive the decoded image signal 122.

The memory (in this embodiment, memory 10c) for storing motionless segments such as the background may be of a type in which newly input decoded image signal portions are overwritten on the storage data rather than simply substituted for the latter.

For example, in the image of FIG. 2, portions of the background appear or hide behind the person 201 as he moves. As the contents of the memory 10c for storing image data of the respective background segments continue to be updated, the area of the background covered by the image data stored in the memory 10c gradually increases. Therefore, consider a case where in a certain frame a movement of the person 201 has caused a portion of the background which has hidden behind the person 201 to appear. In this case, the above configuration provides an advantage that if the decoding side has the same memory contents as this coding apparatus, transmission of mere address information of the background portion that has newly appeared allows the decoding side to produce an image by reading image data of the wall and the painting from the memory. Once image data of the entire background has been stored in both memories of the coding side and the decoding side, it is no longer necessary for the coding side to send code data and it suffices for the coding side to merely send address information. Thus, the amount of generated code data gradually decreases.

In the above embodiment, the coding section 4 codes portions of the prediction error signal 116 corresponding to all the segments by using the coding control parameter of the same value. Instead, as in the case of the first embodiment, the value of the coding control parameter of the coding section 4 may be changed in accordance with the class identification signal supplied from the hierarchizing section 2. This enables further increase of the coding efficiency.

While in the above embodiment only one coding section is provided, the coding apparatus may be so modified that a plurality of coding sections of different coding schemes are provided as in the second embodiment and a proper one of the coding sections is selected for each segment in accordance with the class identification signal 103 supplied from the hierarchizing section 2. In this case, where a coding section for coding segments of a certain class is of a type that does not calculate a prediction error, no corresponding memory is necessary because no prediction is performed.

In the above embodiment, in generating the prediction signal 112 the prediction section 12 searches all the memories 10a-10c to find image data that is similar to each segment of the input image signal 102 of the current frame. Instead, the coding apparatus may be so modified that the prediction section 12 searches only the memory corresponding to the class of each segment in accordance with the class identification signal 103 that is supplied from the hierarchizing section 2. This facilitates the search for similar image data, thus contributing to increase of the coding efficiency.

While in the above embodiment the memory contents are rewritten every time the coding section 4 and the decoding section 16 encodes or decodes a signal, the coding apparatus may be so modified that the memory contents are rewritten every preset time interval. In this case, the contents of a memory corresponding to class of a higher degree of importance are rewritten at a higher frequency, i.e., at shorter time intervals. This accelerates the memory updating processing.

Figure 7:
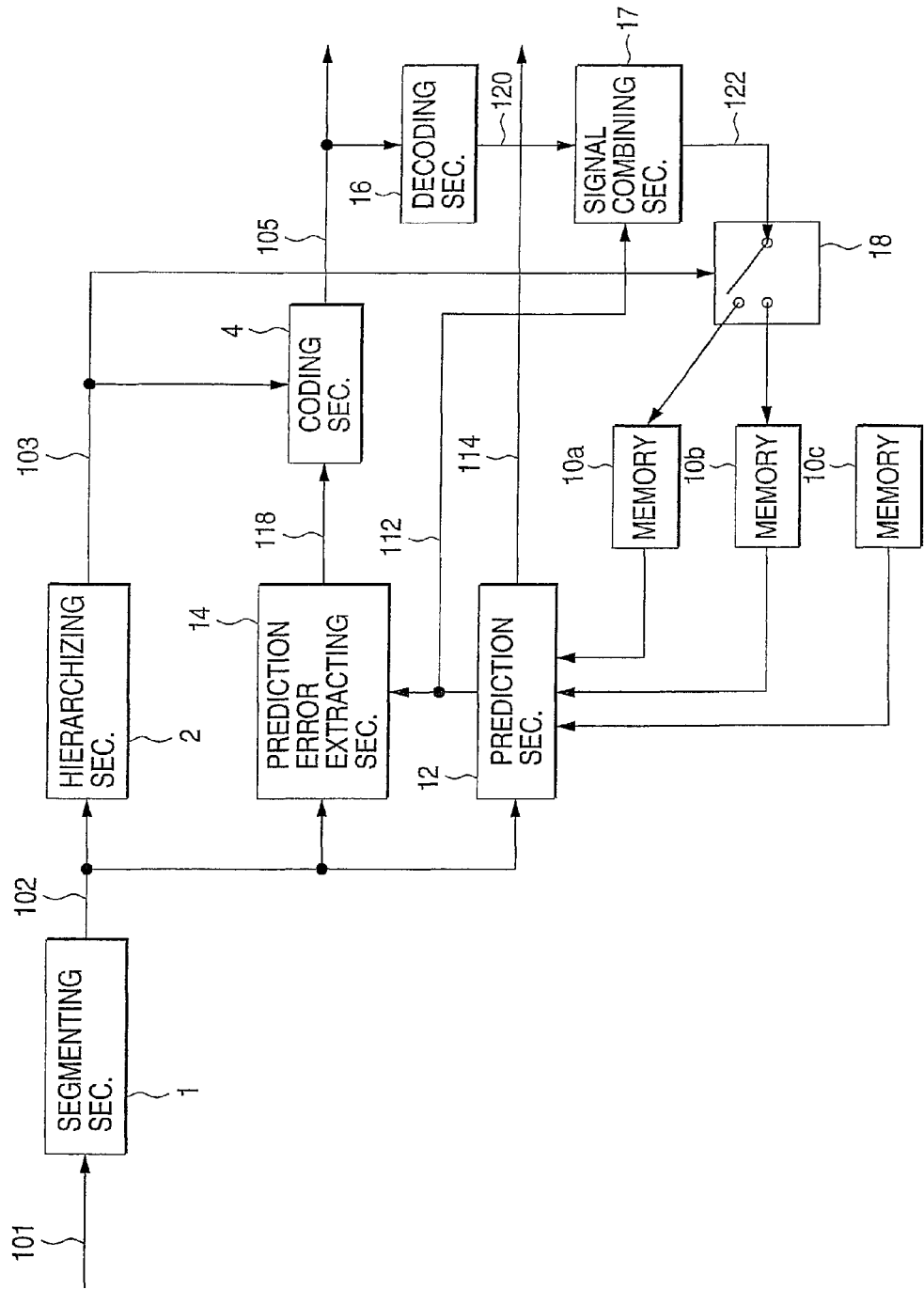
FIG. 7 is a block diagram showing a modification of the third embodiment in which the contents of one of the memories are not updated.

In this modification, where no background information is necessary for teleconferencing use or the like, the interval of rewriting the memory for storing background information may be set at infinity, that is, the memory rewriting may be omitted. In this case, the memory for storing background information needs to store it in advance. For example, background information may be stored in the memory before a teleconference is started. FIG. 7 is a block diagram showing an image coding apparatus having such a configuration. This apparatus is different from the apparatus of FIG. 5 in that the decoded image signal 122 is not input to the memory 10c.

In the above embodiment, in the predicting operation only image data similar to an input image signal portion is found from the memories and used for the prediction. Where the above embodiment is applied to the standard called MPEG1, a Recommendation of MPEG (Moving Picture Experts Group) of ISO, the coding apparatus may be so modified that a plurality of similar image data are read from the memories and combined together. MPEG1 employs a procedure in which consecutive frames are coded in an order different than at the time of input, for instance, in the order of the first frame, the fourth frame, the second frame, the third frame, and so forth. In this case, image data similar to those of the second and third frames can be obtained from image data of the first and fourth frames by averaging, for instance. By performing the prediction based on the image data thus obtained, the power of the prediction error signal and, therefore, the amount of generated code data can be reduced. The coding apparatus of the above embodiment can be applied to the above-mentioned standard if each of the memories 10a-10c can store image data of a plurality of frames on a frame-by-frame basis.

In the above embodiment, when the shape or size of a segment of a prediction source image signal as read from the memories 10a-10c is different from that of a segment of the coding target image signal 102, the prediction section 12 may perform prediction after the shape or size of the segment of the prediction source image signal is changed by interpolation or extrapolation so as to coincide with that of the segment of the image signal 102. Since the prediction source image signal and the image signal 102 are deviated from each other by one frame (or several frames), even segments of those signals representing the same object may different in shape or size. If the prediction section 12 performed prediction by using a prediction source signal having a different shape or size, a resulting prediction error signal would have large power, leading to increase in the amount of code data generated. To solve this problem, the prediction section 12 performs prediction after the shape or size of the segment of the prediction source image signal is changed by interpolation or extrapolation so as to coincide with that of the segment of the image signal 102.

Figure 8A:
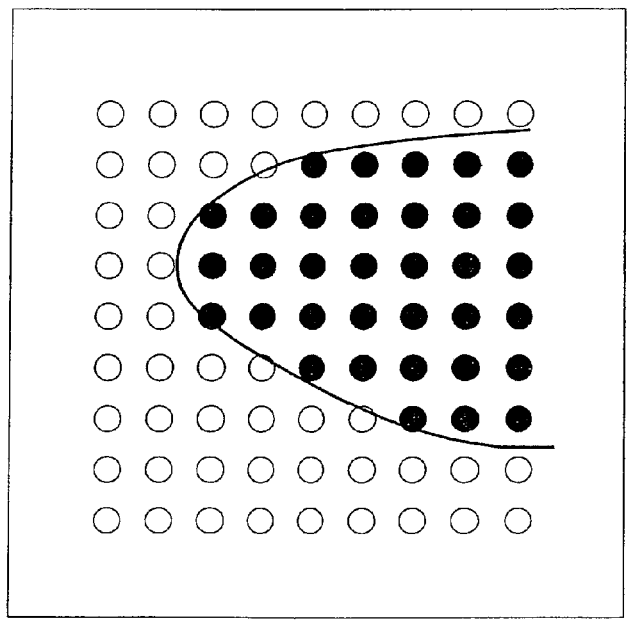
FIGS. 8A and 8B illustrate extrapolation performed on a similar image signal as read out from one of the memories in the third embodiment.
Figure 8B:
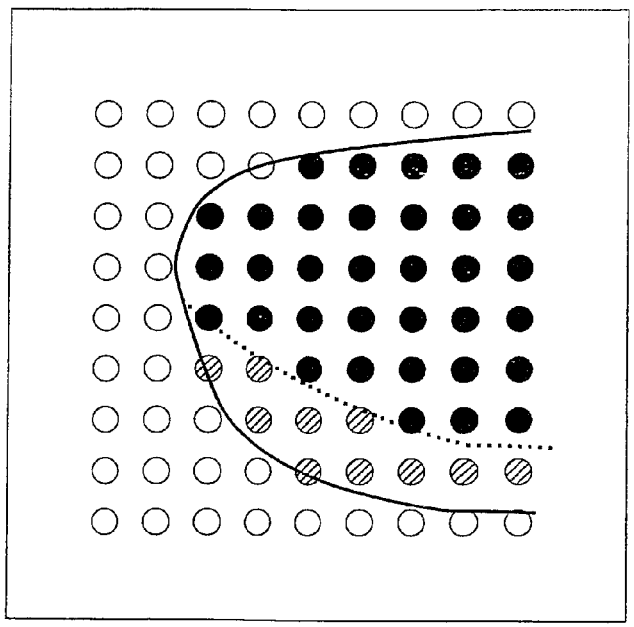
Figure 9:
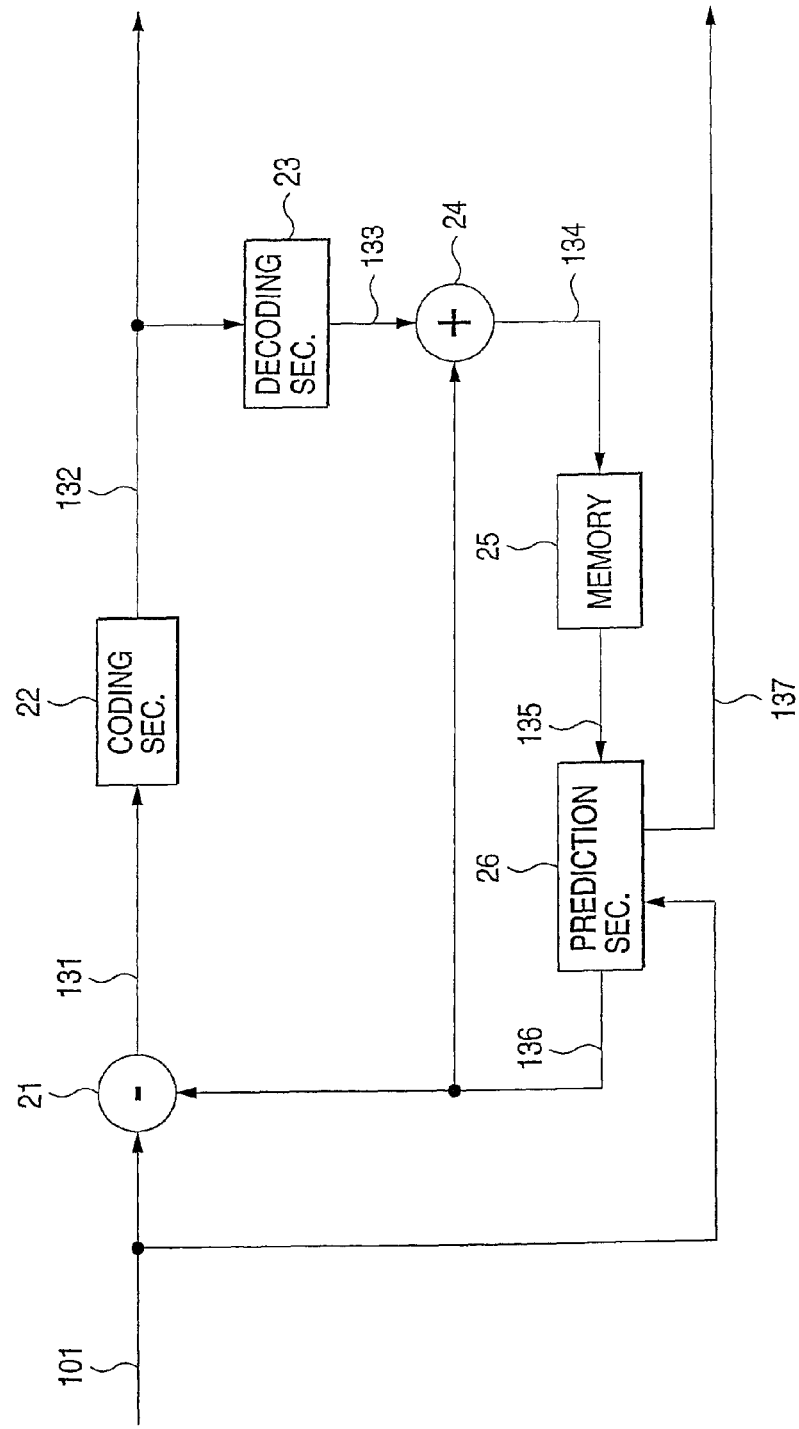
FIG. 9 is a block diagram showing a conventional image coding apparatus.

FIGS. 8A and 8B illustrate how extrapolation is performed. The outline of a segment of the coding target image signal 102 is indicated by a solid line in FIG. 8B, and the outline of a segment of a corresponding similar image signal (prediction source image signal) stored in one of the memories 10a-10c is indicated by a solid line in FIG. 8A. In the figures, hollow circles and sold circles represent pixels and, in particular, the solid circles represent pixels included in the segment of the similar image signal that is stored in the memory. In this case, prediction with extrapolation is performed because information of hatched pixels of FIG. 8B cannot be obtained directly from the solid-circle pixels. A simple method of effecting such extrapolation is to give the hatched pixels the same values as those of solid-circle pixels located at the boundary. Alternatively, the hatched pixels may be given values that are proportional to their distances from the center of the segment. While the above description relates to the case of expanding a segment of a similar image signal, reduction of a segment is performed in a similar manner. In this manner, by performing the prediction after the shape or size of a segment of a prediction source image signal is changed by interpolation or extrapolation so as to coincide with that of a coding target segment, the prediction error signal 116 can be reduced in magnitude, thus enabling reduction in the amount of code data generated.

Embodiment 4

The configuration and operation of a motion prediction circuit according to the fourth embodiment of the invention will be described below.

Figure 10:
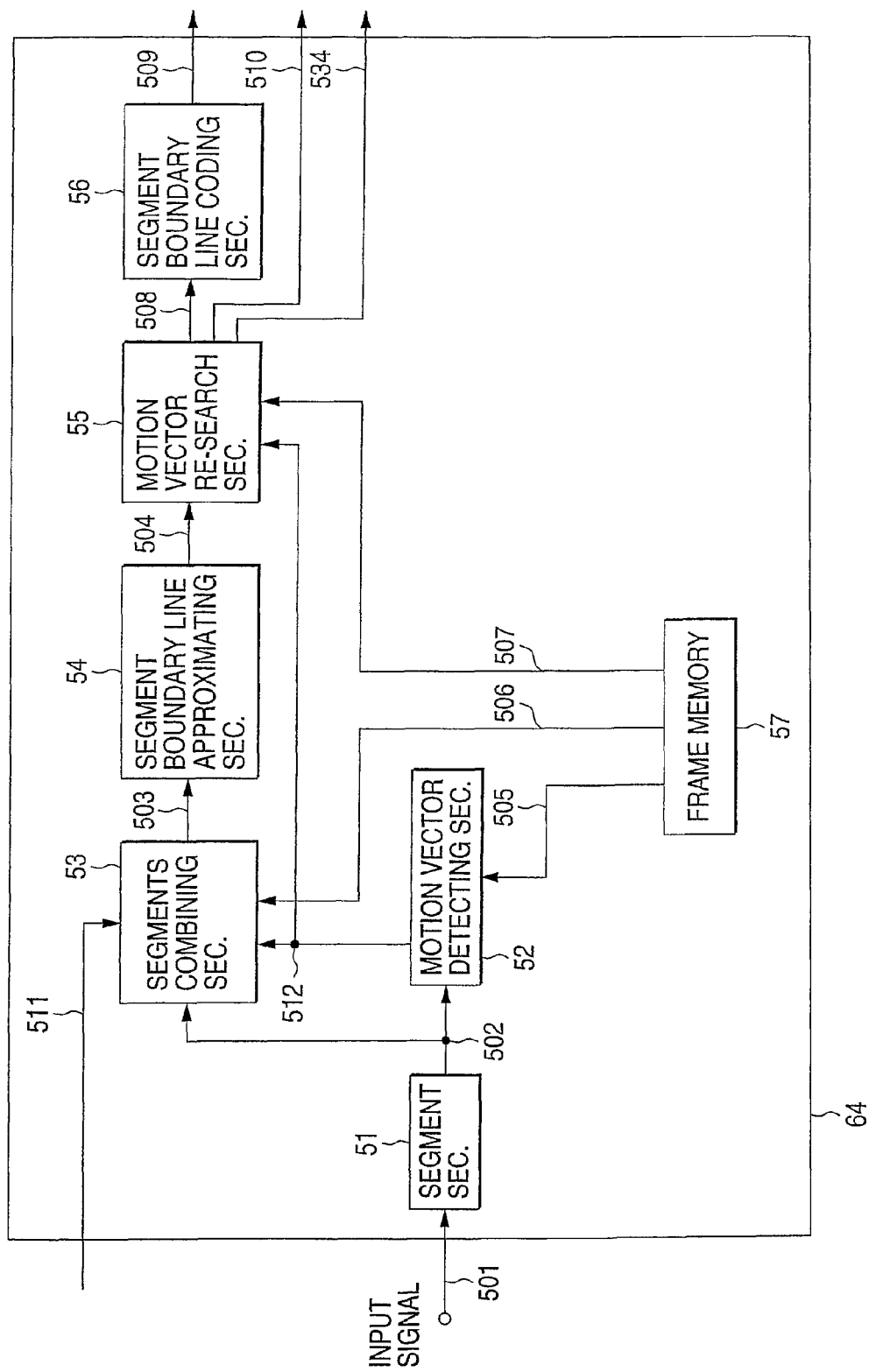
FIG. 10 is a block diagram showing the configuration of a segmentation-type motion prediction circuit according to a fourth embodiment of the invention.

FIG. 10 shows the configuration of this motion prediction circuit. In FIG. 10, a segmenting section 51, a segment boundary line approximating section 54, and a motion vector re-search section 55 are novel components. Reference numeral 53 denotes a segments combining section. A motion vector detecting section 52, a segment boundary line coding section 56, and a frame memory 57 are conventional components.

Reference numeral 501 denotes an input image signal; 502, segment image information; 503, combined segment image information; 504, approximated segment image information; and 505-507, prediction segment image information stored in the frame memory 57. Further, reference numeral 508 denotes segment boundary line information; 509, segment boundary line coded information (novel feature of the invention); 510, motion vectors (novel feature); 511, control information; and 534, prediction block image information.

The operation of the above motion prediction circuit will be described below.

Referring to FIG. 10, an input image signal 501 is supplied to the segmenting section 51. The segmenting section 51 divides the input image, which includes blocks, into segments, and outputs segment image information 502. Conventionally, there have been proposed various techniques of dividing one block into a plurality of segments which techniques utilize the brightness, the color difference, the edge information, etc. In this embodiment, the segmentation is performed by using one those techniques.

Figure 11:
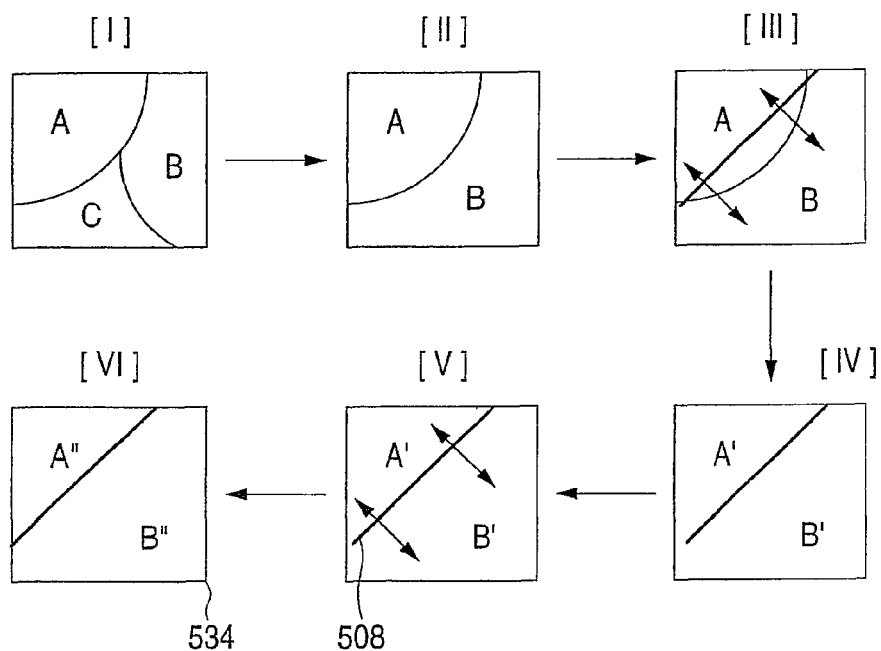
FIG. 11 illustrates operations of a segment combining section, a segment boundary line approximating section, and a motion vector re-search section in the fourth embodiment.

FIG. 11 illustrates the operations of segments combining, segment boundary line approximation, and motion vector re-search which are performed in this embodiment.

In this embodiment, although the segmentation itself is conventional, it is a first important feature that the segmentation is performed such that an image of each block is further divided. The segmenting section 51 divides a block image into, for instance, three segments A, B and C as shown in part [I] of FIG. 11. Receiving the segment image information 502, the motion vector detecting section 52 detects a motion vector 512 for each of the segments A, B and C by referring to coded image information 505 that is stored in the frame memory 57. The motion vector detection itself is a conventional technique. That is, a prediction segment image having a smallest error with respect to an input segment image is found from the coded images, and the position of a found prediction segment image relative to the input segment image is employed as a motion vector.

Next, the operation of the segments combining section 53 will be described.

Although the segment combining section 53 is not essential, the addition of this section allows segments to be combined in a most appropriate manner, thus enabling optimum approximation with a smaller number of segments. Referring to FIG. 11, the three segments A, B and C (see part [I] of FIG. 11) may be combined in three ways: (A+B, C), (A+C, B) and (B+C, A). Where control information 511 instructs the segments combining section 53 to combine the segments into two segments, the segments combining section 53 performs calculation to find one of the three combinations which produces a smallest prediction error.

An example shown in part [II] of FIG. 11 is a case where a smallest prediction error is obtained with the combination (B+C, A). In this example, the segment B+C is newly represented by B. The segments combining section 53 outputs segment image information 503 representing the segments shown in part [II] of FIG. 11. The frame memory 57 outputs prediction segment image information 506 to the segments combining section 53.

Figure 12:
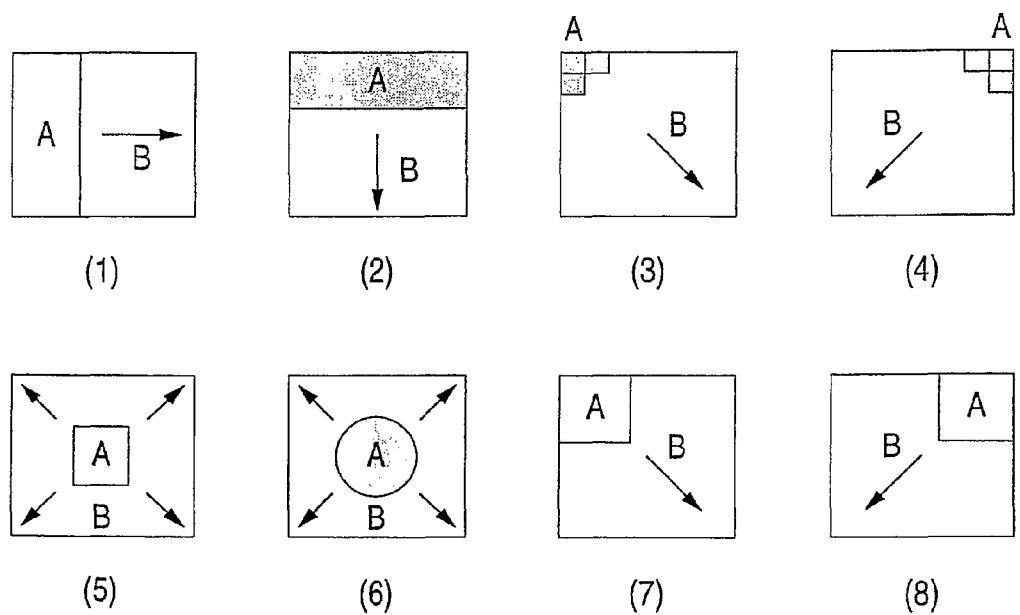
FIG. 12 shows patterns retained by the segment boundary line approximating section in the fourth embodiment.

Receiving the combined segment image information 503, the segment boundary line approximating section 54 performs boundary line approximation in a manner as shown in part [III] of FIG. 11. FIG. 12 illustrates the operation of the segment boundary line approximating section 54.

In FIG. 12, parts (1) to (8) show eight patterns retained by the segment boundary line approximating section 54 and their manner of variation, that is, manner of level determination. The segment boundary line approximating section 54 approximates the received image by applying one of the eight patterns to it. In the example of FIG. 11, the segment boundary line approximating section 54 selects pattern (3) shown in FIG. 12. That is, the segment boundary line approximating section 54 outputs pattern [IV] in response to pattern [III] (see FIG. 11). Approximated segment image information 504 is input to the motion vector re-search section 55.

The operation of the motion vector re-search section 55 will be described below with reference to FIG. 11.

The motion vector re-search section 55 has the same configuration as the motion vector detecting section 52. However, the motion vector re-search section 55 does not detect all the motion vectors again, but determines a boundary line 508 by searching for proper prediction segment images again such that a level adjustment is performed on an approximated pattern that is obtained by moving the boundary in the direction indicated by arrows in part [V] of FIG. 11 and a resulting pattern is compared with the prediction segment images 507.

Thus, the segment boundary line approximating section 55 outputs motion vectors 510 of respective segments A' and B' having the boundary line 508, the boundary line information 508, and prediction block image information 534.

The prediction block image 534 means a block including a plurality of segments being processed, that is, a square block shown in part [VI] of FIG. 11. The segment boundary line coding section 56 encodes the received segment boundary line information 508, and outputs segment boundary line coded information 509.

As described above, the segment boundary line approximating section 54 of this embodiment retains the eight patterns shown in FIG. 12: a horizontal variation of pattern (1), a vertical variation of pattern (2), a top-left/bottom-right variation of pattern (3), a top-right/bottom-left variation of pattern (4), a variation of pattern (5) in which an inside rectangular segment expands toward or contracts away from the four corners, a variation of pattern (6) in which an inside circular segment expands toward or contracts away from the four corners, a variation of pattern (7) in which a square segment varies in the top-left/bottom-right direction, and a variation of pattern (8) in which a square segment varies in the top-right/bottom-left direction. One of the above patterns is output as an approximation of the received segment images 503.

Thus, the segment boundary line approximating section 503 need not perform fast calculation on the segment images 503 to determine their shapes, and it can select a pattern and a level which provide a smallest prediction error simply by comparing the segment images 503 with the eight patterns.

FIGS. 13A and 13B, illustrate a method of coding a segment boundary line in this embodiment.

FIG. 13B shows a pattern that is finally selected by the motion vector re-search section 55, which corresponds to pattern (3) of FIG. 12.

In FIG. 13A, "Pattern" indicates one of patterns (1) to (8) shown in FIG. 12 and "Level" indicates the position of a boundary line shown in part [VI] of FIG. 11 or FIG. 13B. For example, a level value of 3 means a boundary line close to the top-left corner, and the boundary line moves toward the bottom-right corner as the level value increases (FIG. 13B shows a case of a level value of 6. The segment boundary line coding section 56 encodes the level value and outputs a resulting code as a value of "Level" (see FIG. 13A). That is, "Pattern" and "Level" constitute the output signal 509.

On the other hand, "dmv1" and "dmv2" indicate the motion vectors 510. For example, "dmv1" and "dmv2" indicate motion vectors of the hatched portion and the white portion in FIG. 13B.

Thus, where the number of segments is set at 2, "CODE (1)" indicating that segmented coding has been performed and "dmv1," "dmv2," "Pattern" and "Level" are transmitted. Where the conventional prediction coding is performed on a block-by-block basis instead of the prediction coding with segment-by-segment motion compensation, "CODE(0)" and the single motion vector of "dmv1" are transmitted.

According to the coding scheme described above, the number of bits of the segment boundary line coded information 509 is determined by the number of patters and the number of levels of the patterns (see FIG. 12). In the example of FIG. 12 including eight patterns, "Pattern" is expressed by 3 bits and "Level" is expressed by 5 bits if the number of levels is 30.

The above embodiment is directed to the case where the segments combining section 53 is instructed by the control signal 511 to produce two segments.

Alternatively, segment combining can be performed without input of the control signal 511 by employing a scheme in which an evaluation value the segment combining is defined in advance, a combination allowable error limit is determined, and the segment combining is effected if the evaluation value is smaller than the combination allowable error limit. That is, segments are combined if the evaluation value of their combination is smaller than the sum of a prediction error and the allowable error limit.

As another alternative, there may be employed a scheme in which the coding bit amount or the coding bit rate is input as the control signal 511 and segment combining is effected if it exceeds a certain threshold. In this case, segments are combined when the bit rate has an enough margin, and are left separated when the bit rate does not have enough margin. Thus, the degree of prediction approximation can be improved.

Embodiment 5

This embodiment is directed to a case where a segmenting section is composed of a plurality of sections that operate according to different schemes.

FIG. 14 shows the configuration of a segmenting section according to this embodiment. In FIG. 14, a segmenting section 58 utilizes a characteristic quantity 1, for instance, brightness. A segmenting section 59 utilizes a characteristic quantity 2, for instance, a color difference. A segmenting section 60 utilizes a characteristic quantity 3, for instance, edge information. Reference numerals 520-522 denote segment images produced by the respective segmenting sections 58-60.

The segment images 58-60 are subjected to evaluation of a prediction error by using the segment boundary line information 508 and the motion vectors 510, which are outputs of the downstream motion vector re-search section 55. As a result, one of the segmenting sections 58-60 which produces a smallest prediction error is selected, that is, one of their output signals 520-522 is selected as segment images 502, which are supplied to the downstream sections. An evaluation section for selecting a segmenting section that provides a smallest prediction error may be provided in the motion vector re-search section 55 or in a processor that is separate from the configuration of FIG. 1.

Embodiment 6

This embodiment is directed to still another configuration of a segmenting section.

Figure 15:
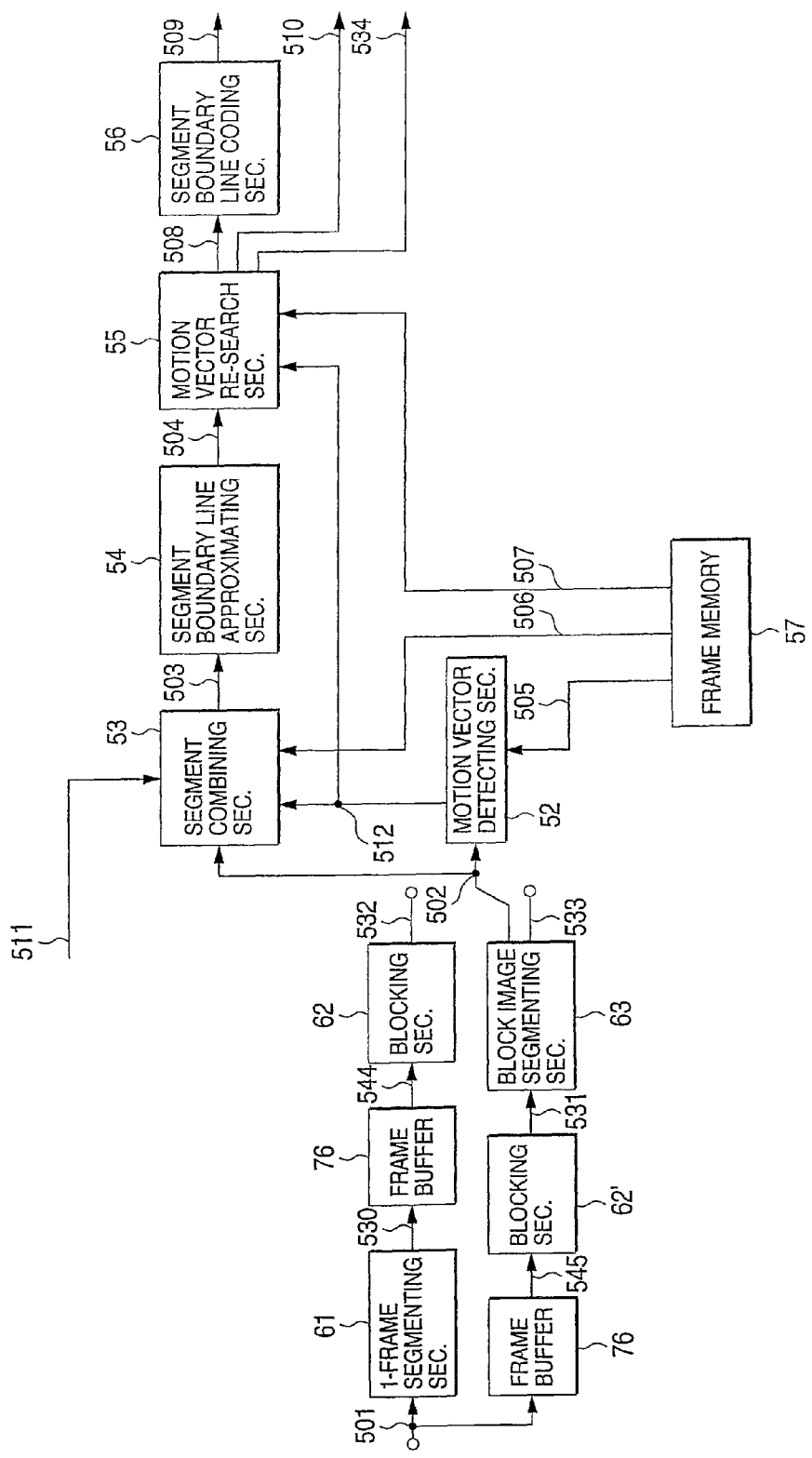
FIG. 15 shows the configuration of a motion prediction circuit according to a sixth embodiment of the invention.

FIG. 15 shows the configuration of a segmenting section according to this embodiment and related components. In FIG. 15, reference numeral 76 denotes a frame buffer for storing a one-frame image; 61, a segmenting section for dividing a one-frame image into a plurality of segment images; 62, a blocking section for dividing each of the segment images into block images. On the other hand, reference numeral 62' denotes a blocking section for dividing an input image into block images, and numeral 63 denotes each of the block images into segment images. Reference numeral 544 denotes segment images of one frame, and numeral 545 represents an original image of one frame.

The segmenting section 51 of the first embodiment corresponds to the collection of the first set of components from the segmenting section 61 to the blocking section 62 and the second set of components from the frame buffer 76 to the segmenting section 63.

The operation of the above configuration will be described below.

An important feature of the above configuration is the provision of the first set of components in which an input one-frame image is generally divided into segment images 530 by the segmenting section 61 and then each of the segment images 530 is further divided into block images 532 by the blocking section 62. Segmented block images 532 (output information) thus obtained are different from segmented block images 533 that are obtained by dividing an one-frame image into block images 531 and further segmenting each of the block images 531 in the same manner as in the fourth embodiment.

The former operation (first set of components) is effective in extracting a general structure or segment, while the latter operation (second set of components) is effective in extracting a finer segment within a block. The output information is supplied to the segment boundary line approximating section 54 and the motion vector re-search section 55, where segment boundary line information and motion vectors are obtained. Then, as in the case of the fifth embodiment, one two kinds of output information which provides a smaller prediction error is selected in consideration of the coding bit amount or the coding bit rate. That is, one of the segmented block image information 532 and 533 is selected to become segment image information 502.

Figure 16:
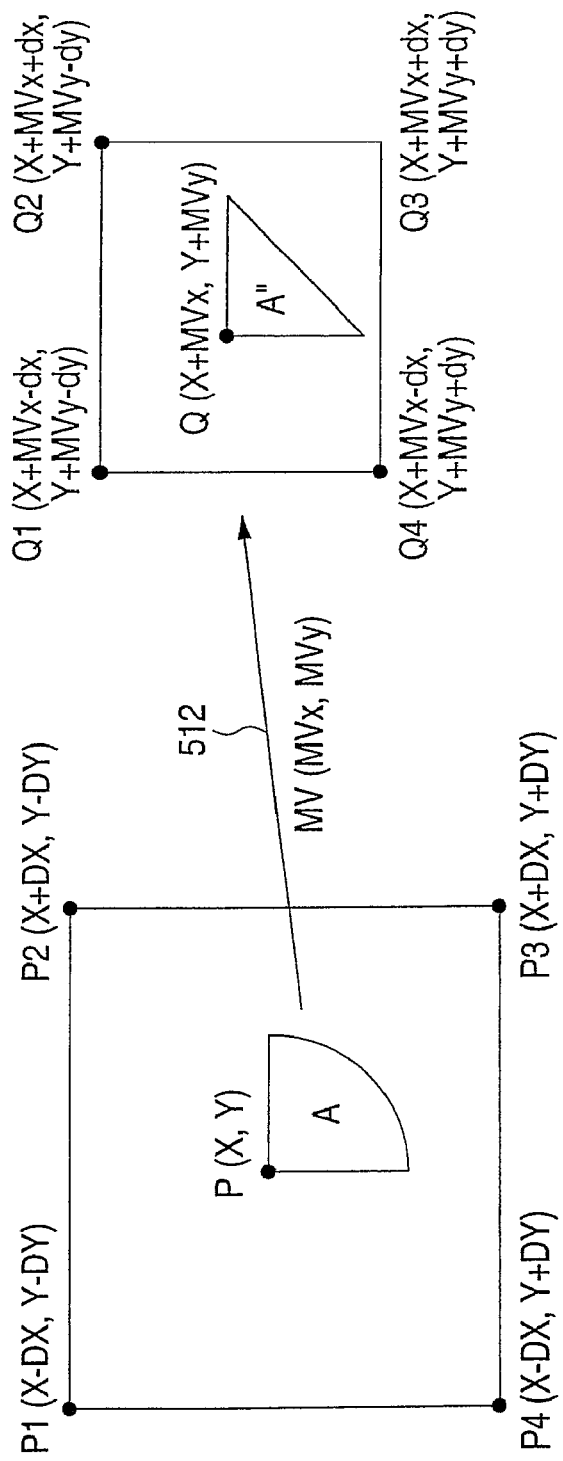
FIG. 16 shows the operation of sections downstream of a segmenting section in the sixth embodiment.

FIG. 16 illustrates the operation of the components downstream of the segmenting section. In FIG. 16, in the motion vector detecting section 52 for determining a motion vector of a segment image A, a rectangular area having apices P1-P4 is searched to detect a motion vector that provides a smallest prediction error. In this case, the movement area of point P that is located in the segment image A is (X−DX, Y−DY) to (X+DX, Y+DY) where DX and DY are search widths. A motion vector 512 thus detected is denoted by MV(MVx, MXy).

In the motion vector re-search section 55, a motion vector of an approximated segment image A" obtained by the segment boundary line approximating section 54 can be obtained by searching a smaller area having search widths (dx, dy) with the segment image A" shifted by the motion vector 512 (dx<DX, dy<DY). The movement area of point Q that is located in the segment image A" is a rectangular are defined by Q1-Q4, whose coordinates are shown in FIG. 16.

Since the subsequent operation is the same as in the fourth embodiment, it is not described here.

Embodiment 7

This embodiment is directed to an image coding apparatus to which the motion prediction circuit of the fourth embodiment is applied.

Figure 17:
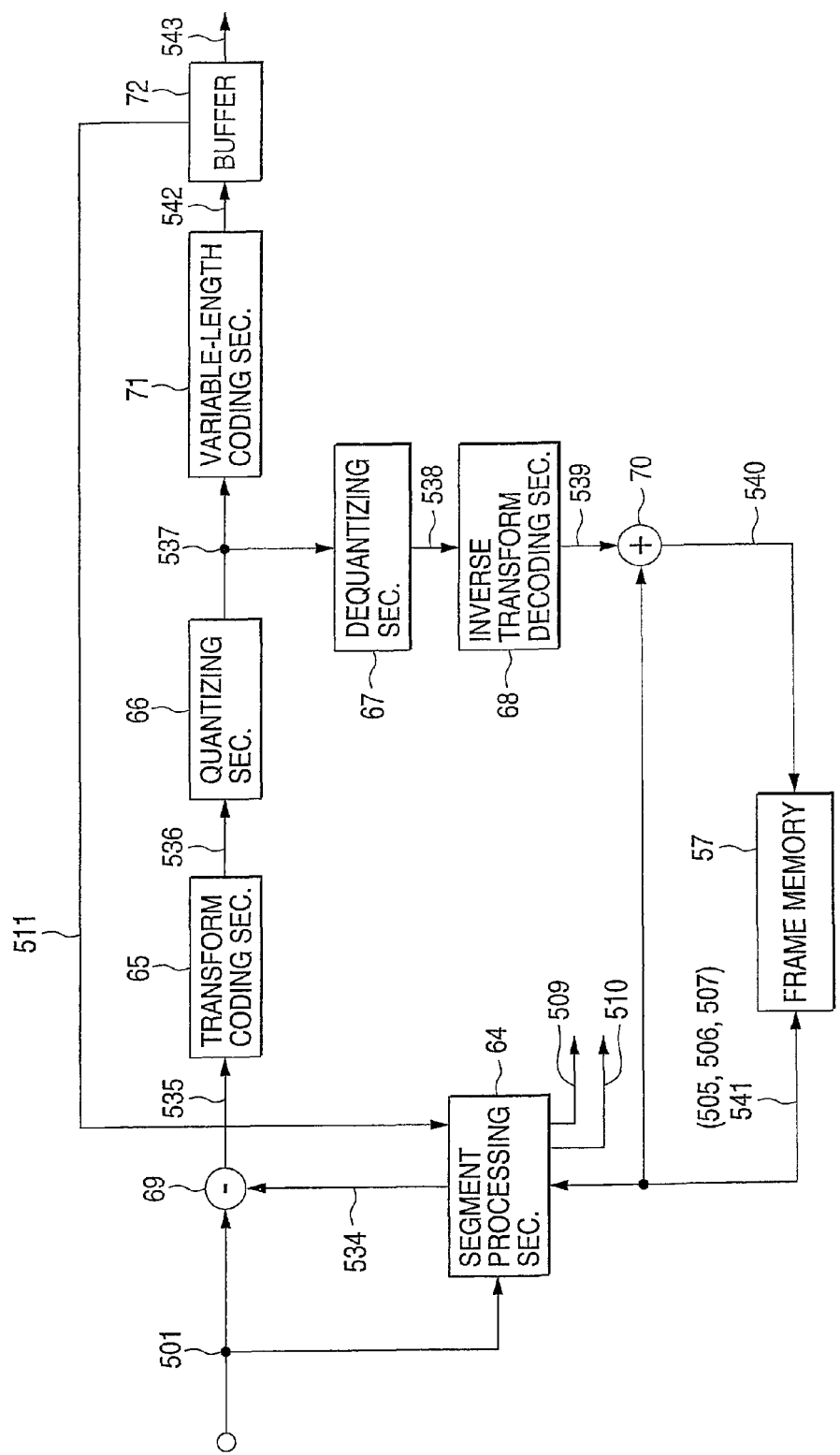
FIG. 17 shows the configuration of an image coding apparatus to a seventh embodiment of the invention to which the segmentation-type motion prediction circuit of the fourth embodiment is applied.

FIG. 17 shows the configuration of a coding apparatus according to this embodiment, in which a segment processing section 64 is the segmentation-type motion prediction circuit of FIG. 10.

The following components shown in FIG. 17 are standard components used in a common coding apparatus. Reference numeral 69 denotes a subtracter for calculating a difference between an input signal 501 and an output signal 534 of the segment processing section 64. Numeral 65 denotes a transform coding section for converting prediction error block images 535 (i.e., output of the subtracter 64) into transform coefficients 536. Numeral 66 denotes a quantizing section for quantizing the transform coefficients 536 into quantized coefficients 537. Numeral 67 denotes a dequantizing section for dequantizing the quantized coefficients 537. Numeral 68 denotes an inverse transform decoding section for returning an output 538 of the dequantizing section 67 to prediction error block images 539. Numeral 70 represents an adder for adding together a prediction image 541 (i.e., output of a frame memory 57) and the prediction error block images 539. For prediction of an image of the next frame, an output 540 of the adder 70 is input to the frame memory 57 as image information of the preceding frame. An output of the frame memory (i.e., prediction image 541) is used in the segment processing section 64.

On the other hand, reference numeral 71 denotes a variable-length coding section for converting the quantized coefficients 537 (i.e., output of the quantizing section 66) into variable-length codewords 542. Numeral 72 denotes a buffer for storing the variable-length codewords 542 and transmitting output variable-length codewords 543 to a transmission line.

The operation of the above image coding apparatus will be described below.

The segment processing section 64 produces prediction block images 534 (see FIG. 10) based on an input signal 501 and reference image information 541 that is sent from the frame memory 57. The prediction segment images 541 include prediction segment images 505-507 (see FIG. 10). Then, a difference between the prediction block images 534 and the input signal 501 is converted by the transform coding section 65 into transform coefficients, which are converted into quantized coefficients 537 by the quantizing section 66. On one hand, the quantized coefficients 537 are converted into prediction error block images 539 through the dequantizing section 67 and the inverse transform decoding section 68. The prediction error block images 539 are added to the prediction image 541 of the preceding frame, to become decoded block images 540, which is again stored into the frame memory 57.

On the other hand, the quantized coefficients 537 are subjected to variable-length coding, to become variable-length codewords 542. After being stored in the buffer 72, the variable-length codewords 542 are transmitted to the transmission line as variable-length codewords 543. As described in the fourth embodiment, the storage information amount of the buffer 72 is fed back, as the control signal 511, to the segment processing section 64, more specifically, the segments combining section 53, and used to control combining of segments within a block. Segment boundary line coded information 509 and motion vectors 510 of the respective segments are transmitted from the segment processing section 64 to the transmission line.

Embodiment 8

This embodiment is directed to an image decoding apparatus, which corresponds to the image coding apparatus of the seventh embodiment.

Figure 18:
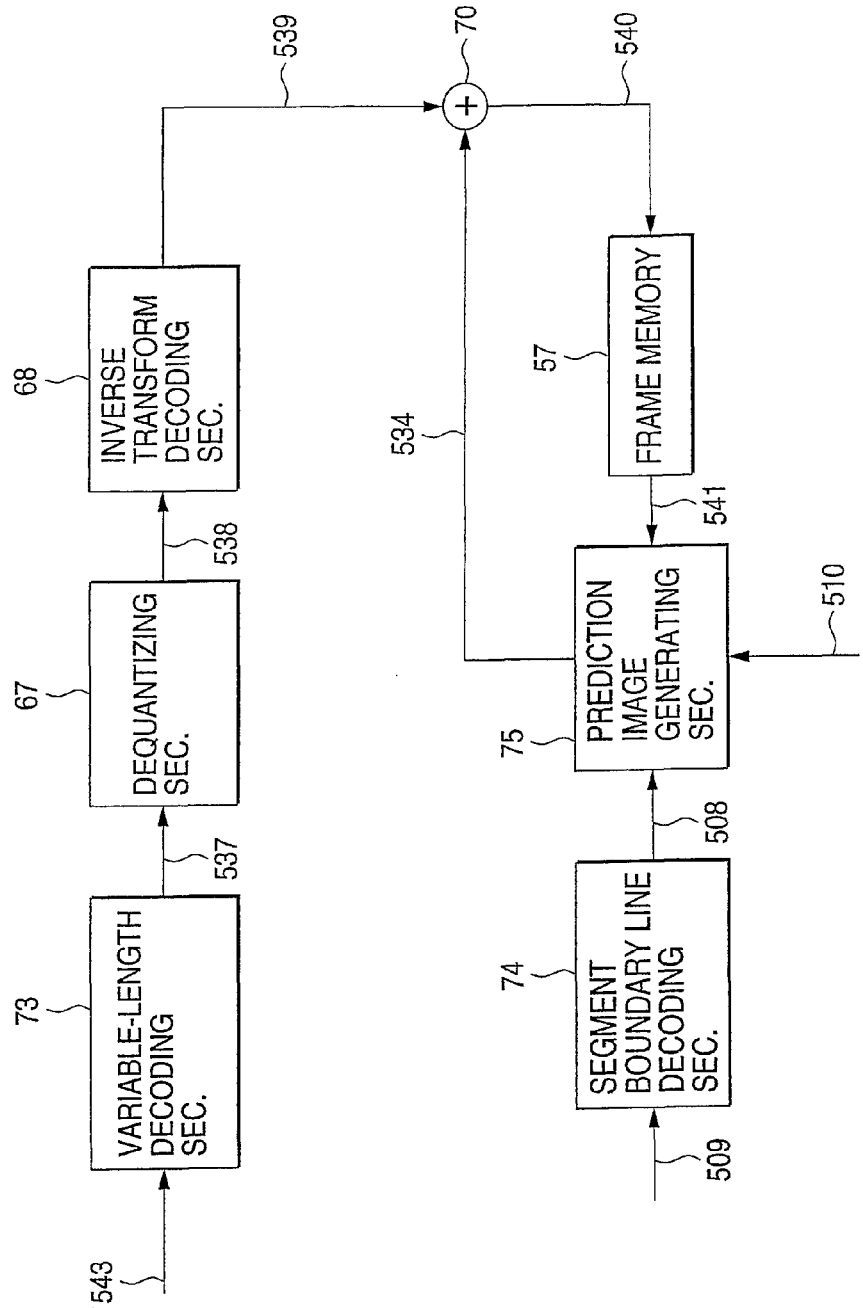
FIG. 18 shows an image decoding apparatus according to an eighth embodiment of the invention.
Figure 19:
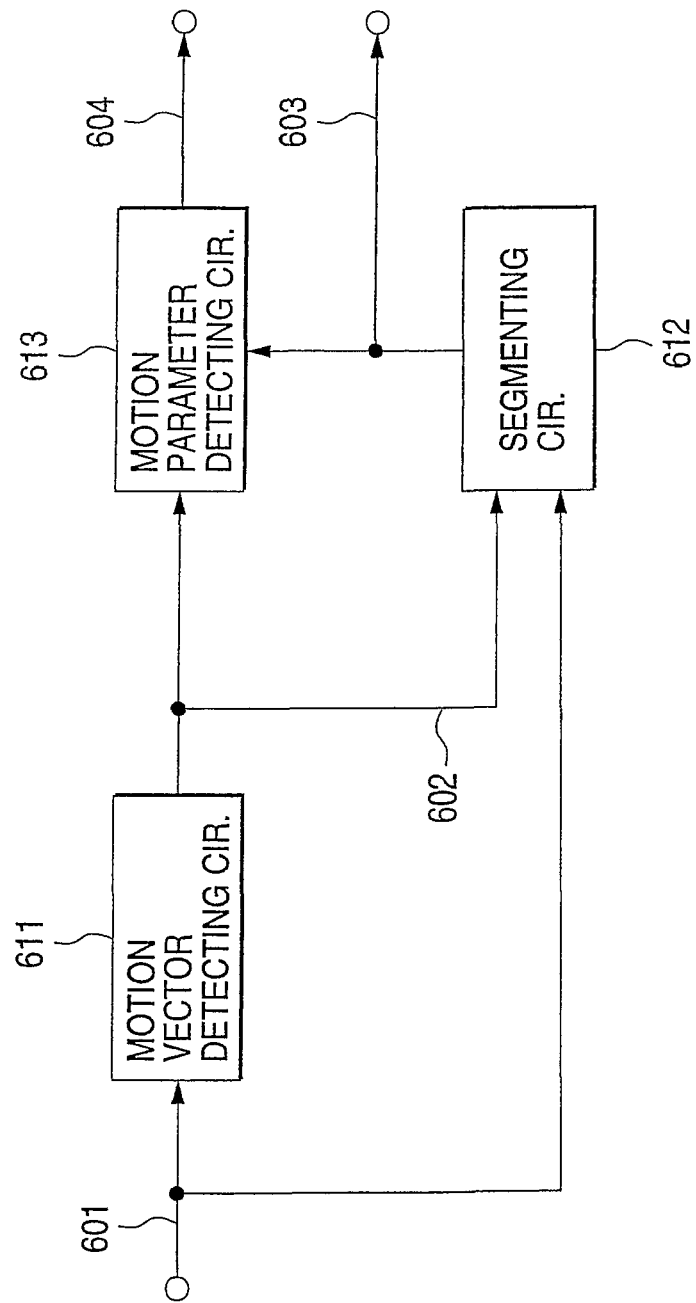
FIG. 19 is a block diagram showing the configuration of a conventional motion prediction circuit.
Figure 20:
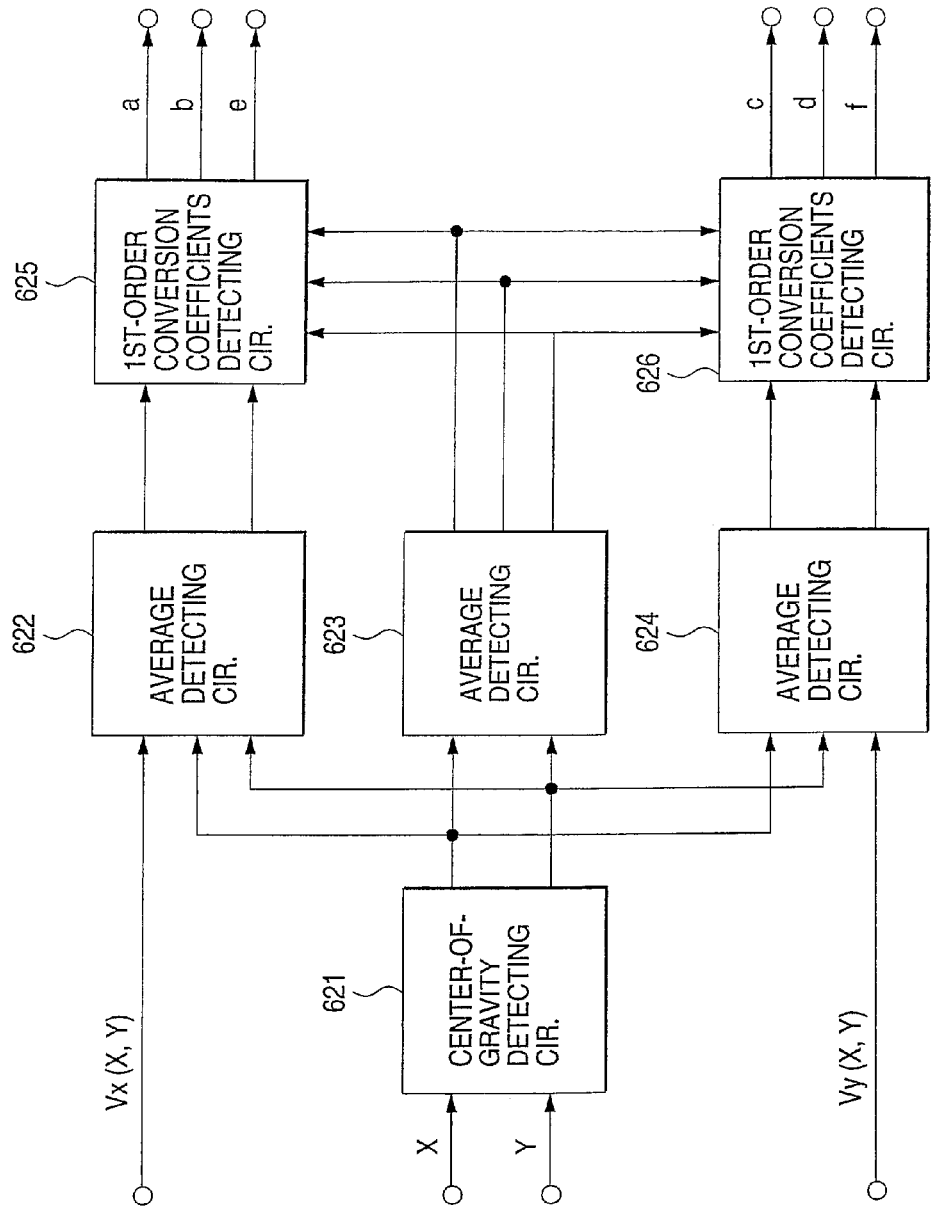
FIG. 20 is a block diagram showing the configuration of a motion parameter detecting circuit used in the conventional motion prediction circuit of FIG. 19.

FIG. 18 shows the configuration of a decoding apparatus according to this embodiment.

Important features of this embodiment reside in a segment boundary line decoding section 74 and a prediction image generating section 75. The following components are equivalent to components of a common decoding apparatus. That is, reference numeral 73 denotes a variable-length decoding section; 67, a dequantizing section; 68, an inverse transform decoding section 68; 70, an adder; and 57, a frame memory.

The operation of the above decoding apparatus will be described below.

Variable-length codewords 543 received from a transmission line are subjected to variable-length decoding in the variable-length decoding section 73, to produce quantized coefficients 537. The quantized coefficients 537 are dequantized by the dequantizing section 67, to produce transform coefficients 538, which are then converted into prediction error block images 539 by the inverse transform decoding section 68. The prediction error block images 539 are added to prediction block images 534 of the preceding frame by the adder 70, to become new decoded block images 540, which are stored into the frame memory 57.

On the other hand, segment boundary line coded information 509 separated from the reception signal is input to the segment boundary line decoding section 74. The section 74 performs a converting operation the reverse to the operation of the segment boundary line coding section 56 of the fourth embodiment, to produce a segment boundary line 508 be decoding. Thus, the state of part [VI] of FIG. 11 is restored. The prediction image generating section 75 generates the prediction block images based on the segment boundary line 508 and motion vectors 510 that have been separated from the reception signal by referring to the prediction segment images 541 of the preceding frame that are read from the frame memory 57. Thus, fine segment images are obtained for each block.

Embodiment 9

This embodiment is directed to another segmentation-type motion prediction circuit.

Referring to FIG. 10 (fourth embodiment), this embodiment is intended to simplify the operation of the motion vector re-search section 55 by utilizing motion vectors 512 detected by the motion vector detecting section 52. That is, segment images newly approximated by the segment boundary line approximating section 54 are similar in image characteristics to segment images before the approximation, motion vectors are determined by referring to images in the vicinity of the segment images before the approximation rather than referring to all the images again. This operation shortens the search time.

According to the first aspect of the invention (first to third embodiments), an input image is divided into segments in accordance with its content and the segments are classified into classes in accordance with the degree of importance in visual recognition. In coding each segment, the coding control parameter or coding scheme is changed in accordance with its class so that the code amount of a segment that is less important in visual recognition is reduced. As a result, the amount of code data can be reduced while sufficient image quality is maintained for segments that are important in visual recognition.

In the configuration in which a prediction source image signal is read from a memory corresponding to the class indicated by a class identification signal, the time required for the search of a prediction source signal can be reduced.

If the coding time interval of each segment is changed in accordance with its class and the memory updating interval is changed accordingly, the amount of code data as well as the load of memory rewriting can be reduced, contributing to increase of the coding efficiency.

According to the second aspect of the invention (fourth to ninth embodiments), since the motion prediction circuit has the segmenting means, the motion vector detecting means, the segment boundary line approximating means, and the motion vector re-search means, input block images can be transmitted or output as a smaller amount of image information efficiently and with a small prediction error.

By virtue of the provision of the segments combining means, block images can be combined more efficiently into image information.

In combining segments, the coding bit amount or the coding bit rate is also referred to. For example, the segment combining is effected when the coding bit rate is low, and is not effected when the coding bit rate is high. Therefore, high-quality image information can be obtained within the limit of the transmission rate.

If a plurality of segmenting sections having methods of extracting different features of an input image signal are provided and one of those segmenting sections is selected which provides the smallest prediction error, high-quality image information can be obtained.

The segmenting means is so constructed that selection is made between the first segmenting section in which an input image signal is divided into blocks first and a feature of the input image signal is extracted on a block-by-block basis and the second segmenting section in which an input image signal is divided into segments first by extracting a feature of the input image signal on a frame-by-frame basis and then each segment is divided into blocks. Therefore, high-quality image signal can always be transmitted or output efficiently without being affected by a feature or a characteristic of the input image.

In the motion vector re-search operation, since final motion vectors are determined by referring to motion vectors detected by the motion vector detecting means, the final motion vectors can be obtained in a short time.

According to the image coding apparatus, an image signal can be coded at high prediction efficiency to produce a smaller amount of coded image data.

According to the image decoding apparatus, a smaller amount of coded image data can be decoded at high prediction efficiency.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for coding a prediction error signal, comprising:
   reading a prediction source image signal and an image signal to be coded, the image signal having an arbitrary shape and size and varies in shape and size from the prediction source image signal;
   interpolating or extrapolating the prediction source image signal within the image frame of the prediction source image signal to obtain a processed prediction source image signal;
   generating a prediction signal based on the processed prediction source image signal;
   obtaining a prediction error signal based on the prediction signal and the image signal to be coded; and
   predictively coding the prediction error signal.

2. An image coding apparatus, comprising:
   a memory storing a prediction source image signal and an image signal to be coded, the image signal having an arbitrary shape and size and varies in shape and size from the prediction source image signal;
   a prediction section interpolating or extrapolating the prediction source image signal within the image frame of the prediction source image signal to obtain a processed prediction source image signal and generating a prediction signal based on the processed prediction source image signal;
   a prediction error extractor obtaining a prediction error signal based on the prediction signal and the image signal to be coded; and
   a coder predictively coding the prediction error signal.

* * * * *